US012757224B2

(12) United States Patent
Farag

(10) Patent No.: US 12,757,224 B2
(45) Date of Patent: Oct. 6, 2026

(54) METHOD AND APPARATUS FOR INTER-UE CO-ORDINATION SIGNALING

(71) Applicant: Samsung Electronics Co., Ltd., Suwon-si (KR)

(72) Inventor: Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 685 days.

(21) Appl. No.: 18/069,191

(22) Filed: Dec. 20, 2022

(65) Prior Publication Data

US 2023/0217462 A1 Jul. 6, 2023

Related U.S. Application Data

(60) Provisional application No. 63/316,285, filed on Mar. 3, 2022, provisional application No. 63/315,374, filed on Mar. 1, 2022, provisional application No. 63/309,308, filed on Feb. 11, 2022, provisional application No. 63/302,348, filed on Jan. 24, 2022, provisional application No. 63/298,490, filed on Jan. 11, 2022, provisional application No. 63/296,367, filed on Jan. 4, 2022.

(51) Int. Cl.
*H04W 72/25* (2023.01)
*H04W 72/40* (2023.01)

(52) U.S. Cl.
CPC .......... *H04W 72/25* (2023.01); *H04W 72/40* (2023.01)

(58) Field of Classification Search
CPC ................ H04W 72/25; H04W 72/40; H04W 5/0094; H04W 4/40; H04W 72/0446; H04W 72/1263; H04W 92/18; H04L 5/0094
See application file for complete search history.

(56) References Cited

U.S. PATENT DOCUMENTS

| | | | | |
|---|---|---|---|---|
| 2018/0123744 A1* | 5/2018 | Nogami | H04W 52/248 |
| 2021/0153231 A1* | 5/2021 | Yeo | H04W 72/0446 |
| 2021/0250954 A1 | 8/2021 | Li et al. | |
| 2021/0321430 A1* | 10/2021 | Baghel | H04W 72/1263 |
| 2022/0322302 A1* | 10/2022 | Park | H04W 72/20 |
| 2023/0148024 A1* | 5/2023 | Hwang | H04W 72/0446 370/329 |

(Continued)

FOREIGN PATENT DOCUMENTS

WO WO-2023014044 A1 * 2/2023 ........... H04W 76/14

OTHER PUBLICATIONS

"5G; NR; Physical channels and modulation (3GPP TS 38.211 version 16.7.0 Release 16)", ETSI TS 138 211 V16.7.0, Oct. 2021, 138 pages.

"5G; NR; Multiplexing and channel coding (3GPP TS 38.212 version 16.7.0 Release 16)", ETSI TS 138 212 V16.7.0, Oct. 2021, 157 pages.

(Continued)

*Primary Examiner* — Atique Ahmed

(57) ABSTRACT

Methods and apparatuses for inter-user equipment (UE) co-ordination signaling in a wireless communication system. A method of operating a UE includes receiving a first stage sidelink control information (SCI) format that includes information on a second stage SCI format. The first stage SCI format is a SCI format 1-A and the second stage SCI format is a SCI format 2-C. The method further includes receiving the SCI format 2-C and determining, based on an indicator field in the SCI format 2-C, a type of information included in the SCI format 2-C.

12 Claims, 12 Drawing Sheets

(56) References Cited

U.S. PATENT DOCUMENTS

| | | | | |
|---|---|---|---|---|
| 2023/0189294 A1* | 6/2023 | Dong | H04W 72/02 370/329 |
| 2024/0015755 A1* | 1/2024 | Pan | H04W 72/25 |
| 2024/0172185 A1* | 5/2024 | Hong | H04W 72/25 |

OTHER PUBLICATIONS

"5G; NR; Physical layer procedures for control (3GPP TS 38.213 version 16.7.0 Release 16)", ETSI TS 138 213 V16.7.0, Oct. 2021, 191 pages.
"5G; NR; Physical layer procedures for data (3GPP TS 38.214 version 16.7.0 Release 16)", ETSI TS 138 214 V16.7.0, Oct. 2021, 176 pages.
"5G; NR; Medium Access Control (MAC) protocol specification (3GPP TS 38.321 version 16.6.0 Release 16)", ETSI TS 138 321 V16.6.0, Oct. 2021, 160 pages.
"5G; NR; Radio Resource Control (RRC); Protocol specification (3GPP TS 38.331 version 16.6.0 Release 16)", ETSI TS 38 331 V16.6.0, Oct. 2021, 948 pages.
"LTE; Evolved Universal Terrestrial Radio Access (E-UTRA); Physical layer procedures (3GPP TS 36.213 version 16.7.1 Release 16)", ETSI TS 136 213 V16.7.1, Oct. 2021, 581 pages.
International Search Report and Written Opinion issued Apr. 11, 2023 regarding International Application No. PCT/KR2023/000177, 7 pages.
Zhejiang Lab, "Inter-UE coordination for mode 2 enhancements", 3GPP TSG RAN WG1 Meeting #107-e, R1-2111354, Nov. 2021, 3 pages.
Catt et al., "Remaining issues on Inter-UE coordination for Mode 2 enhancements", 3GPP Tsg Ran WG1 Meeting #107-e, R1-2111229, Nov. 2021, 17 pages.
Convida Wireless, "Inter-UE Coordination for NR SL Mode 2 Enhancement", 3GPP TSG RAN WG1 Meeting #107-e, R1-2112034, Nov. 2021, 12 pages.
Extended European Search Report issued Mar. 10, 2025 regarding Application No. 23737383.2, 13 pages.
Samsung, "On Inter-UE Coordination for Mode2 Enhancements", 3GPP TSG RAN WG1 #107-e, R1-2111759, Nov. 2021, 19 pages.
"3rd Generation Partnership Project; Technical Specification Group Radio Access Network; NR; Multiplexing and channel coding (Release 17)", 3GPP TS 38.212 V17.0.0, Dec. 2021, 190 pages.
"3rd Generation Partnership Project; Technical Specification Group Radio Access Network; NR; Physical layer procedures for data (Release 16)", 3GPP TS 38.214 V16.8.0, Dec. 2021, 172 pages.

* cited by examiner

METHOD AND APPARATUS FOR INTER-UE CO-ORDINATION SIGNALING

CROSS-REFERENCE TO RELATED APPLICATIONS AND CLAIM OF PRIORITY

The present application claims priority to: U.S. Provisional Patent Application No. 63/296,367, filed on Jan. 4, 2022; U.S. Provisional Patent Application No. 63/298,490, filed on Jan. 11, 2022; U.S. Provisional Patent Application No. 63/302,348, filed on Jan. 24, 2022; U.S. Provisional Patent Application No. 63/309,308, filed on Feb. 11, 2022; U.S. Provisional Patent Application No. 63/315,374, filed on Mar. 1, 2022; and U.S. Provisional Patent Application No. 63/316,285, filed on Mar. 3, 2022. The contents of the above-identified patent documents are incorporated herein by reference.

TECHNICAL FIELD

The present disclosure relates generally to wireless communication systems and, more specifically, the present disclosure relates to inter-user equipment (UE) co-ordination signaling in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to inter-UE co-ordination signaling in a wireless communication system.

In one embodiment, a UE is provided. The UE includes a transceiver configured to receive a first stage sidelink control information (SCI) format that includes information on a second stage SCI format, where the first stage SCI format is a SCI format 1-A and the second stage SCI format is a SCI format 2-C, and receive the SCI format 2-C. The UE further includes a processor operably coupled to the transceiver that is configured to determine, based on an indicator field in the SCI format 2-C, a type of information included in the SCI format 2-C.

In another embodiment, another UE is provided. The UE includes a processor configured to determine a type of information to be transmitted in a second stage SCI format and a transceiver operably coupled to the processor. The transceiver is configured to transmit a sidelink a first stage SCI format that includes information on the second stage SCI format, where the first stage SCI format is a SCI format 1-A and the second stage SCI format is a SCI format 2-C, and transmit the SCI format 2-C that includes an indicator field based on the type of information.

In yet another embodiment, a method of operating a UE is provided. The method includes receiving a first stage SCI format that includes information on a second stage SCI format. The first stage SCI format is a SCI format 1-A and the second stage SCI format is a SCI format 2-C. The method further includes receiving the SCI format 2-C and determining, based on an indicator field in the SCI format 2-C, a type of information included in the SCI format 2-C.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.7.0, "NR; Physical channels and modulation"; 3GPP TS 38.212 v16.7.0, "NR; Multiplexing and Channel coding"; 3GPP TS 38.213 v16.7.0, "NR; Physical Layer Procedures for Control"; 3GPP TS 38.214 v16.7.0, "NR; Physical Layer Procedures for Data"; 3GPP TS 38.321 v16.6.0, "NR; Medium Access Control (MAC) protocol specification"; 3GPP TS 38.331 v16.6.0, "NR; Radio Resource Control (RRC) Protocol Specification;" and 3GPP TS 36.213 v16.7.1, "Evolved Universal Terrestrial Radio Access (E-UTRA); Physical layer procedures."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
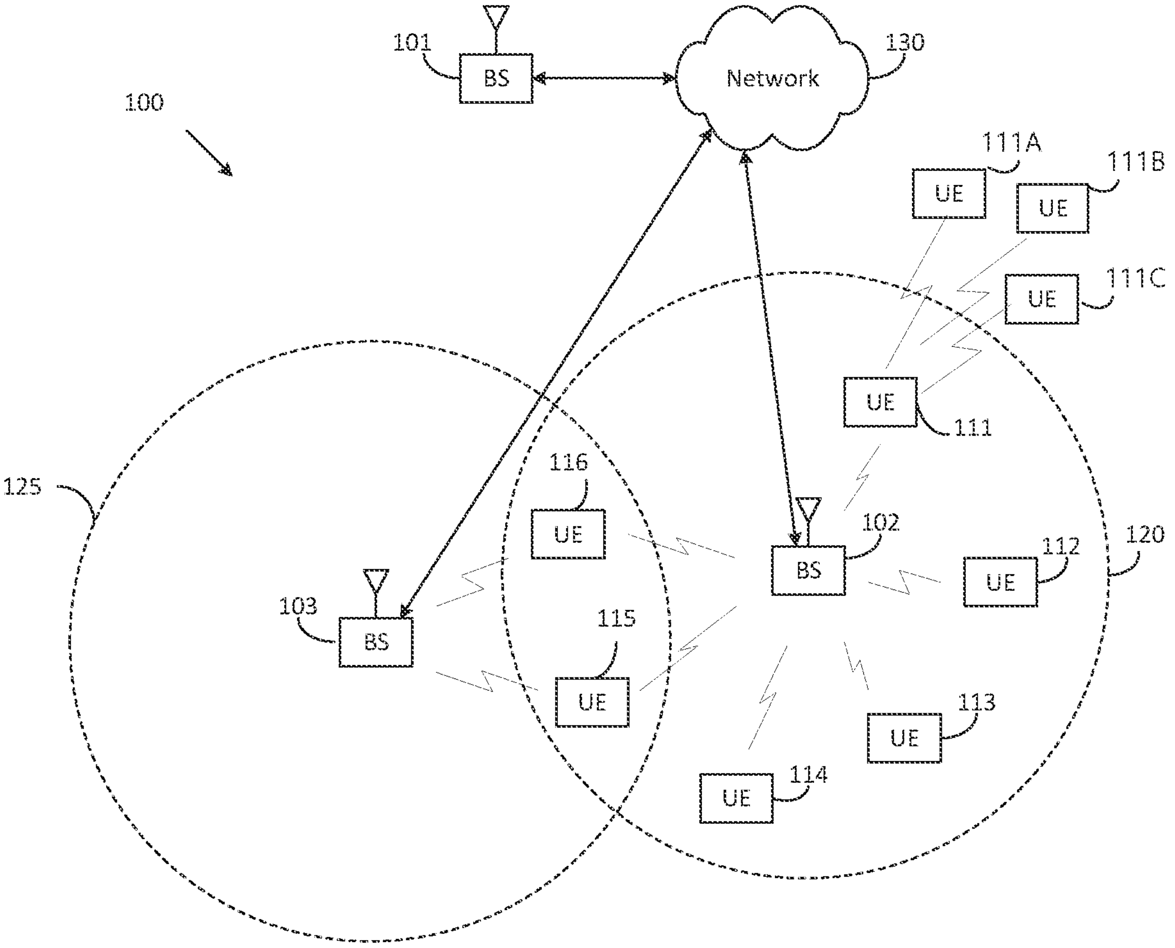
FIG. 1 illustrates an example of wireless network according to embodiments of the present disclosure.
Figure 2:
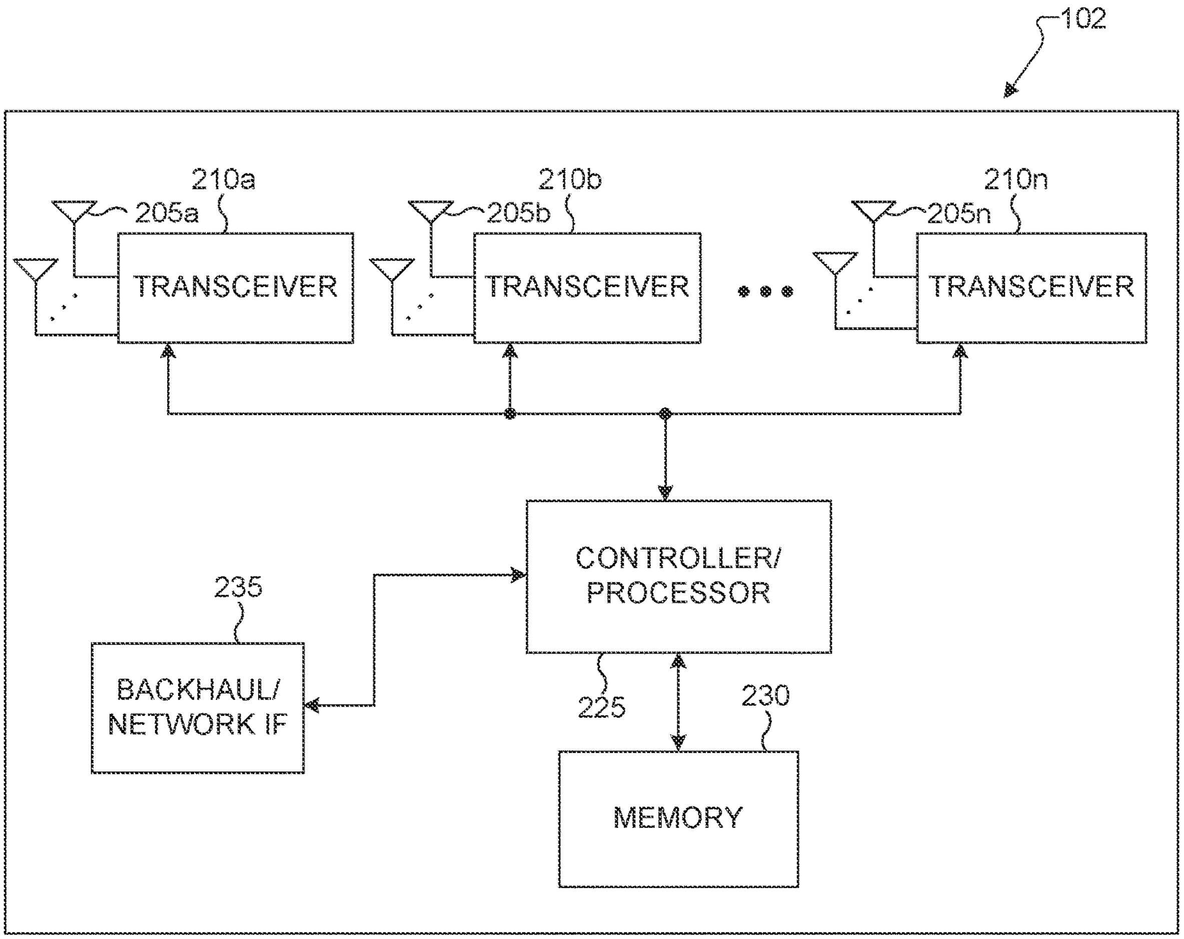
FIG. 2 illustrates an example of gNB according to embodiments of the present disclosure.
Figure 3:
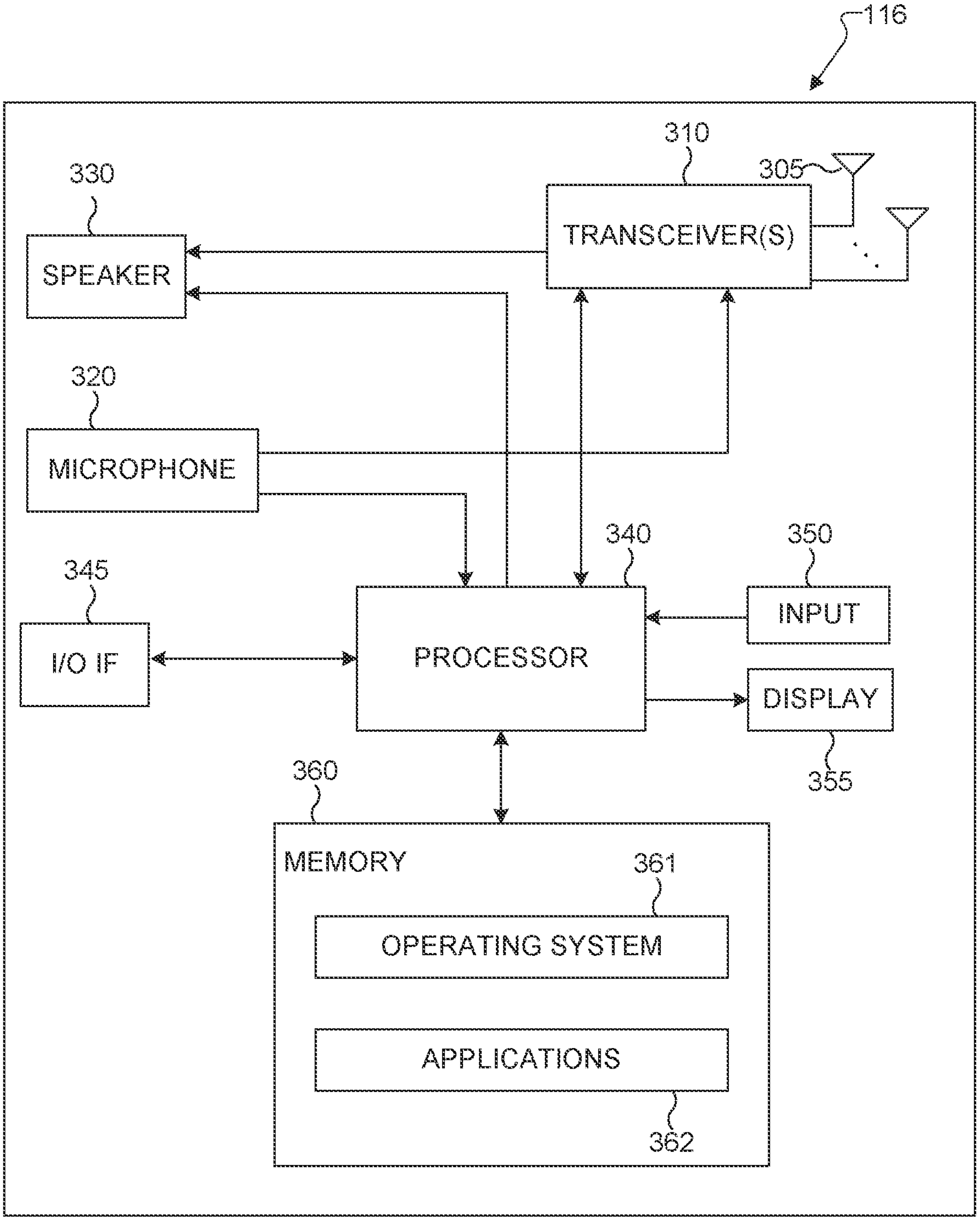
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

In another example, the UE 116 may be within network coverage and the other UE may be outside network coverage (e.g., UEs 111A-111C). In yet another example, both UE are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as sidelink at the physical layer) for communication.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for an inter-UE co-ordination signaling in a wireless communication system. In certain embodiments, and one or more of the gNBs 101-103 includes circuitry, programing, or a combination thereof, for an inter-UE co-ordination signaling in a wireless communication system.

Although FIG. 1 illustrates one example of a wireless network, various changes may be made to FIG. 1. For example, the wireless network could include any number of gNB s and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UEs 111A to 111C) that may have a SL communication with the UE 111. The UE 111 can communicate directly with the UEs 111A to 111C through a set of SLs (e.g., SL interfaces) to provide sideline communication, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication with their other UEs (such as UEs 111A to 111C as for UE 111).

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The trans ceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL and/or SL channels and/or signals and the transmission of UL and/or SL channels and/or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for an inter-UE co-ordination signaling in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
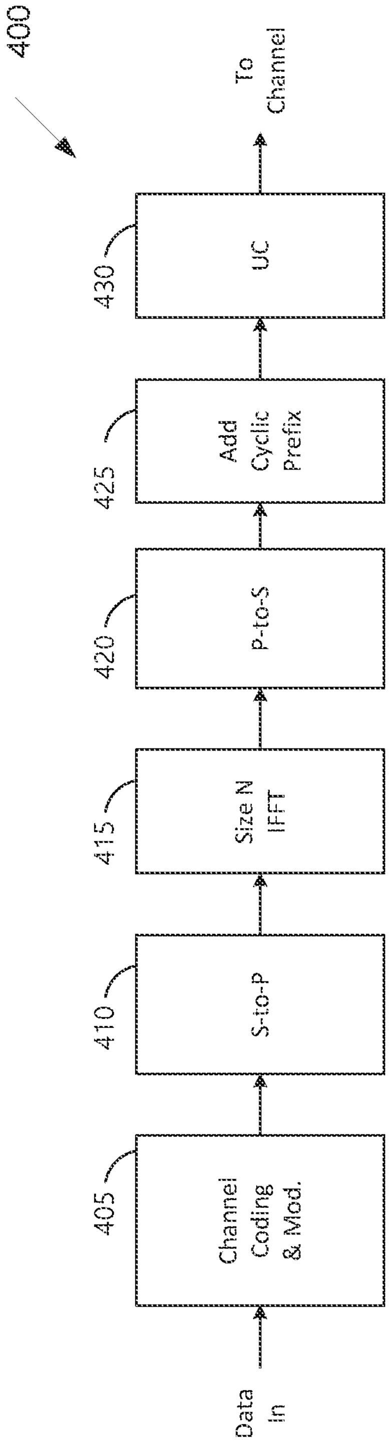
FIGS. 4 and 5 illustrate example of wireless transmit and receive paths according to this disclosure.
Figure 5:
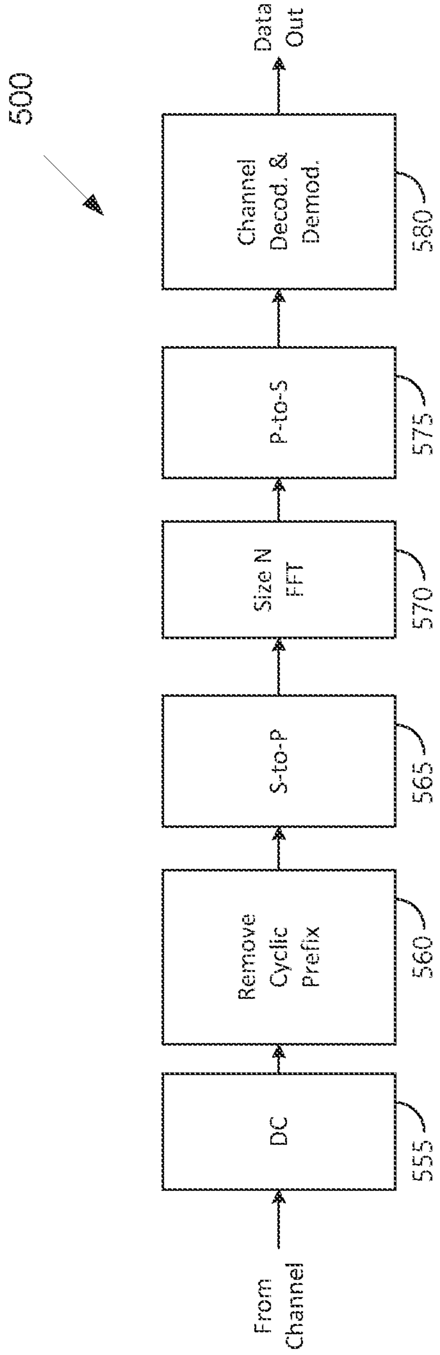

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications. In some embodiments, the receive path 500 is configured to support SL sensing, SL measurements, and inter-UE co-ordination for SL communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S)

block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. A transmitted RF signal from a first UE arrives at a second UE after passing through the wireless channel, and reverse operations to those at the first UE are performed at the second UE.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A time unit for DL signaling, for UL signaling, or for SL signaling on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz.

In another example, a slot can have a duration of 0.25 milliseconds and include 14 symbols and an RB can have a BW of 720 kHz and include 12 SCs with SC spacing of 60 kHz. An RB in one symbol of a slot is referred to as physical RB (PRB) and includes a number of resource elements (REs). A slot can be either full DL slot, or full UL slot, or hybrid slot similar to a special subframe in time division duplex (TDD) systems.

In addition, a slot can have symbols for SL communications. A UE can be configured one or more bandwidth parts (BWPs) of a system BW for transmissions or receptions of signals or channels.

SL signals and channels are transmitted and received on sub-channels within a resource pool, where a resource pool is a set of time-frequency resources used for SL transmission and reception within a SL BWP. SL channels include physical SL shared channels (PSSCHs) conveying data information and second stage/part SL control information (SCI), physical SL control channels (PSCCHs) conveying first stage/part SCI for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, and physical SL Broadcast channel (PSBCH) conveying system information to assist in SL synchronization. SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. SCI can include two parts/stages corresponding to two respective SCI formats where, for example, the first SCI format is multiplexed on a PSCCH, and the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UE. In a groupcast mode, a PSCCH/PSSCH conveys SL information from one UE to a group of UEs within a (pre-)configured set. In a broadcast mode, a PSCCH/PSSCH conveys SL information from one UE to all surrounding UEs. In NR release 16, there are two resource allocation modes for a PSCCH/PSSCH transmission. In resource allocation mode 1, a gNB schedules a UE on the SL and conveys scheduling information to the UE transmitting on the SL through a DCI format. In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a UE can be (pre-)configured one of two options for reporting of HARQ-ACK information by the UE: (1) HARQ-ACK reporting option (1): a UE can attempt to decode a transport block (TB) in a PSSCH reception if, for example, the UE detects a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB; and (2) HARQ-ACK reporting option (2): a UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

In HARQ-ACK reporting option (1), when a UE that transmitted the PSSCH detects a NACK in a PSFCH reception, the UE can transmit another PSSCH with the TB (retransmission of the TB). In HARQ-ACK reporting option (2) when a UE that transmitted the PSSCH does not detect an ACK in a PSFCH reception, such as when the UE detects a NACK or does not detect a PSFCH reception, the UE can transmit another PSSCH with the TB.

A sidelink resource pool includes a set/pool of slots and a set/pool of RBs used for sidelink transmission and sidelink reception. A set of slots which belong to a sidelink resource pool can be denoted by $$\left\{t'^{SL}_0, t'^{SL}_1, t'^{SL}_2, \ldots, t'^{SL}_{T'_{MAX}-1}\right\}$$

and can be configured, for example, at least using a bitmap. Where, $T'_{MAX}$ is the number of SL slots in a resource pool in 1024 frames. Within each slot $$t'^{SL}_y$$

of a sidelink resource pool, there are $N_{subCH}$ contiguous sub-channels in the frequency domain for sidelink transmission, where $N_{subCH}$ is provided by a higher-layer parameter. Subchannel m, where m is between 0 and $N_{subCH}-1$, is given by a set of $n_{subCHsize}$ contiguous PRBs, given by $n_{PRB}=n_{subCHstart}+n_{subCHsize}+j$ where j=0, 1, . . . , $n_{subCHsize}-1$, $n_{subCHstart}$ and $n_{subCHsize}$ are provided by higher layer parameters.

For resource (re-)selection or re-evaluation in slot n, a UE can determine a set of available single-slot resources for transmission within a resource selection window $[n+T_1, n+T_2]$, such that a single-slot resource for transmission, $R_{x,y}$ is defined as a set of $L_{subCH}$ contiguous subchannels x+i, where i=0, 1, . . . , $L_{subCH}-1$ in slot $$t^{SL}_y.$$

$T_1$ is determined by the UE such that, $$0 \le T_1 \le T^{SL}_{proc,1},$$

where $$T^{SL}_{proc,1}$$

is a PSSCH processing time for example as defined in 3GPP standard specification (TS 38.214). $T_2$ is determined by the UE such that $T_{2min} \le T_2 \le$ Remaining Packet Delay Budget, as long as $T_{2min}$ < Remaining Packet Delay Budget, else $T_2$ is equal to the remaining packet delay budget. $T_{2min}$ is a configured by higher layers and depends on the priority of the SL transmission.

The slots of a SL resource pool are determined as show in follow examples.

In one example, let set of slots that may belong to a resource be denoted by $$\{t^{SL}_0, t^{SL}_1, t^{SL}_2, \ldots, t^{SL}_{T_{MAX}-1}\},$$

where $$0 \le t^{SL}_i < 10240 \times 2^{\mu},$$

and $0 \le i < T_{max}$. μ is the sub-carrier spacing configuration. μ=0 for a 15 kHz sub-carrier spacing. μ=1 for a 30 kHz sub-carrier spacing. μ=2 for a 60 kHz sub-carrier spacing. μ=8 for a 120 kHz sub-carrier spacing. The slot index is relative to slot #0 of SFN #0 (system frame number 0) of the serving cell, or DFN #0 (direct frame number 0).

The set of slots includes all slots except: (1) $N_{S-SSB}$ slots that are configured for SL SS/PBCH Block (S-SSB); (2) $N_{nonSL}$ slots where at least one SL symbol is not not-semi-statically configured as UL symbol by higher layer parameter tdd-UL-DL-ConfigurationCommon or sl-TDD-Configuration. In a SL slot, OFDM symbols Y-th, (Y+1)-th, . . . , (Y+X−1)-th are SL symbols, where Y is determined by the higher layer parameter sl-StartSymbol and X is determined by higher layer parameter sl-LengthSymbols;

and (3) $N_{reserved}$ reserved slots. Reserved slots are determined such that the slots in the set $$\{t_0^{SL}, t_1^{SL}, t_2^{SL}, \ldots, t_{T_{MAX}-1}^{SL}\}$$

is a multiple of the bitmap length ($L_{bitmap}$), where the bitmap ($b_0, b_1, \ldots, b_{L_{bitmap}-1}$) is configured by higher layers.

The reserved slots are determined as shown in following examples.

In one example, let $\{l_0, l_1, \ldots, l_{2^\mu \times 10240 - N_{S\text{-}SSB} - N_{nonSL}-1}\}$ be the set of slots in range 0 . . . $2^\mu \times 10240-1$, excluding S-SSB slots and non-SL slots. The slots are arranged in ascending order of the slot index.

In one example, the number of reserved slots is given by: $N_{reserved}=(2^\mu \times 10240-N_{S\text{-}SSB}-N_{nonSL}) \bmod L_{bitmap}$.

In one example, the reserved slots $l_r$ are given by:

$$r = \left\lfloor \frac{m \cdot (2^\mu \times 10240 - N_{S\text{-}SSB} - N_{nonSL})}{N_{reserved}} \right\rfloor,$$

where $m = 0, 1, \ldots, N_{reserved} - 1$.

$T_{max}$ is given by: $T_{max}=2^\mu \times 10240-N_{S\text{-}SSB}-N_{nonSL}-N_{reserved}$.

The slots are arranged in ascending order of slot index.

The set of slots belonging to the SL resource pool, $$\{t'^{SL}_0, t'^{SL}_1, t'^{SL}_2, \ldots, t'^{SL}_{T'_{MAX}-1}\},$$

are determined as follows: (1) each resource pool has a corresponding bitmap ($b_0, b_1, \ldots, b_{L_{bitmap}-1}$) of length $L_{bitmap}$; (2) a slot $$t_k^{SL}$$

belongs to the SL resource pool if $b_{k \bmod L_{bitmap}}=1$; and (3) the remaining slots are indexed successively staring from 0, 1, . . . $T'_{MAX}-1$. Where, $T'_{MAX}$ is the number of remaining slots in the set.

Slots can be numbered (indexed) as physical slots or logical slots, wherein physical slots include all slots numbered sequential, while logical slots include only slots that can be allocated to sidelink resource pool as described above numbered sequentially. The conversion from a physical duration, $P_{rsvp}$ in milli-second to logical slots, $$P'_{rsvp},$$

is given by $$P'_{rsvp} = \left\lceil \frac{T'\max}{10240 \text{ ms}} \times P_{rsvp} \right\rceil$$

(see in 3GPP standard specification TS 38.214).

For resource (re-)selection or re-evaluation in slot n, a UE can determine a set of available single-slot resources for transmission within a resource selection window [$n+T_1$, $n+T_2$], such that a single-slot resource for transmission, $R_{x,y}$ is defined as a set of $L_{subCH}$ contiguous subchannels x+i, where i=0, 1, . . . , $L_{subCH}-1$ in slot $$t_y^{SL}.$$

$T_1$ is determined by the UE such that, $$0 \le T_1 \le T_{proc,1}^{SL},$$

where $$T_{proc,1}^{SL}$$

is a PSSCH processing time for example as defined in TS 38.214. $T_2$ is determined by the UE such that $T_{2min} \le T_2 \le$Remaining Packet Delay Budget, as long as $T_{2min}$<Remaining Packet Delay Budget, else $T_2$ is equal to the Remaining Packet Delay Budget. $T_{2min}$ is configured by higher layers and depends on the priority of the SL transmission.

The resource (re-)selection is a two-step procedure: (1) the first step (e.g., performed in the physical layer) is to identify the candidate resources within a resource selection window. Candidate resources are resources that belong to a resource pool, but exclude resources (e.g., resource exclusion) that were previously reserved, or potentially reserved by other UEs. The resources excluded are based on SCIs decoded in a sensing window and for which the UE measures a SL RSRP that exceeds a threshold. The threshold depends on the priority indicated in a SCI format and on the priority of the SL transmission. Therefore, sensing within a sensing window involves decoding the first stage SCI, and measuring the corresponding SL RSRP, wherein the SL RSRP can be based on PSCCH DMRS or PSSCH DMRS. Sensing is performed over slots where the UE doesn't transmit SL. The resources excluded are based on reserved transmissions or semi-persistent transmissions that can collide with the excluded resources or any of reserved or semi-persistent transmissions; the identified candidate resources after resource exclusion are provided to higher layers and (2) the second step (e.g., preformed in the higher layers) is to select or re-select a resource from the identified candidate resources the identified candidate resources after resource exclusion are provided to higher layers.

During the first step of the resource (re-)selection procedure, a UE can monitor slots in a sensing window [$n-T_0$, $n-T_{proc,0}$), where the UE monitors slots belonging to a corresponding sidelink resource pool that are not used for the UE's own transmission. To determine a candidate single-slot resource set to report to higher layers, a UE excludes (e.g., resource exclusion) from the set of available single-slot resources for SL transmission within a resource pool and within a resource selection window.

In one embodiment, the following example can be provided.

In on example, single slot resource $R_{x,y}$, such that for any slot $$t_m'^{SL}$$

not monitored within the sensing window with a hypothetical received SCI format 1-0, with a "resource reservation period" set to any periodicity value allowed by a higher layer parameter reseverationPeriodAllowed, and indicating all sub-channels of the resource pool in this slot, satisfies condition provided in the present disclosure.

In one example, single slot resource $R_{x,y}$, such that for any received SCI within the sensing window: (1) the associated L1-RSRP measurement is above a (pre-)configured SL-RSRP threshold, where the SL-RSRP threshold depends on the priority indicated in the received SCI and that of the SL transmission for which resources are being selected; and (2) the received SCI in slot $$t'^{SL}_{m},$$

or if "Resource reservation field" is present in the received SCI the same SCI is assumed to be received in slot $$t'^{SL}_{m+q\times P'_{rsvp\_Rx}},$$

indicates a set of resource blocks that overlaps $$R_{x,y+j\times P'_{rsvp\_Tx}}.$$

In such examples, q=1, 2, . . . , Q, where: (1) if $$P_{rsvp\_RX} \leq T_{scal} \text{ and } n' - m < P'_{rsvp\_Rx} \rightarrow Q = \left\lceil \frac{T_{scal}}{P_{rsvp\_RX}} \right\rceil.$$

$T_{scal}$ is $T_2$ in units of milli-seconds; (2) Else Q=1; and (3) if n belongs to $$\left(t'^{SL}_{0}, t'^{SL}_{1}, \ldots, t'^{SL}_{T'_{max}-1}\right),$$

n'=n, else n' is the first slot after slot n belonging to set $$\left(t'^{SL}_{0}, t'^{SL}_{1}, \ldots, t'^{SL}_{T'_{max}-1}\right).$$

In such example, (1) j=0, 1, . . . , $C_{resel}-1$, (2) $P_{rsvp\_RX}$ is the indicated resource reservation period in the received SCI in physical slots, and $$P'_{rsvp\_Rx}$$

is that value converted to logical slots, and (3)

$$P'_{rsvp\_Tx}$$

is the resource reservation period of the SL transmissions for which resources are being reserved in logical slots.

In such example, if the candidate resources are less than a (pre-)configured percentage, such as 20%, of the total available resources within the resource selection window, the (pre-) configured SL-RSRP thresholds are increased by a predetermined amount, such as 3 dB.

NR sidelink introduced two new procedures for mode 2 resource allocation; re-evaluation and pre-emption.

A re-evaluation check occurs when a UE checks the availability of pre-selected SL resources before the resources are first signaled in an SCI format, and if needed re-selects new SL resources. For a pre-selected resource to be first-time signaled in slot m, the UE performs a re-evaluation check at least in slot $m-T_3$.

The re-evaluation check includes: (1) performing the first step of the SL resource selection procedure as illustrated in 3GPP standard specification 38.214 (e.g., clause 8.1.4 of TS 38.214), which involves identifying a candidate (available) sidelink resource set in a resource selection window as previously described; (2) if the pre-selected resource is available in the candidate sidelink resource set, the resource is used/signaled for sidelink transmission; and (3) else, the pre-selected resource is not available in the candidate sidelink resource set, a new sidelink resource is re-selected from the candidate sidelink resource set.

A pre-emption check occurs when a UE checks the availability of pre-selected SL resources that have been previously signaled and reserved in an SCI format, and if needed re-selects new SL resources. For a pre-selected and reserved resource to be signaled in slot m, the UE performs a pre-emption check at least in slot $m-T_3$.

When pre-emption check is enabled by higher layers, pre-emption check includes: (1) performing the first step of the SL resource selection procedure as illustrated in 3GPP standard specification (i.e., clause 8.1.4 of TS 38.214), which involves identifying candidate (available) sidelink resource set in a resource selection window as previously described; (2) if the pre-selected and reserved resource is available in the candidate sidelink resource set, the resource is used/signaled for sidelink transmission; and (3) else, the pre-selected and reserved resource is NOT available in the candidate sidelink resource set. The resource is excluded from the candidate resource set due to an SCI, associated with a priority value $P_{RX}$, having an RSRP exceeding a threshold. Let the priority value of the sidelink resource being checked for pre-emption be $P_{TX}$.

If the priority value $P_{RX}$ is less than a higher-layer configured threshold and the priority value $P_{RX}$ is less than the priority value $P_{TX}$. The pre-selected and reserved sidelink resource is pre-empted. A new sidelink resource is re-selected from the candidate sidelink resource set. Note that, a lower priority value indicates traffic of higher priority. Else, the resource is used/signaled for sidelink transmission.

As described above, the monitoring procedure for resource (re)selection during the sensing window requires reception and decoding of a SCI format during the sensing window as well as measuring the SL RSRP. This reception and decoding process and measuring the SL RSRP increases a processing complexity and power consumption of a UE for sidelink communication and requires the UE to have receive circuitry on the SL for sensing even if the UE only transmits and does not receive on the sidelink.

3GPP Release 16 is the first NR release to include sidelink through work item "5G V2X with NR sidelink," the mechanisms introduced focused mainly on vehicle-to-everything (V2X), and can be used for public safety when the service requirement can be met. Release 17 extends sidelink support to more use cases through a work item "NR sidelink enhancement." One of the motivations for the sidelink enhancement in Release 17, as mentioned in the work item description (WID), is power savings.

Power saving enables UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized.

One of the objectives of the Release 17 sidelink enhancement work item is to specify resource allocation enhancements that reduce power consumption, taking the principle of the release 14 LTE sidelink random resource selection and partial sensing as baseline with potential enhancements.

Specify resource allocation to reduce power consumption of the UEs: (1) baseline is to introduce the principle of Rel-14 LTE sidelink random resource selection and partial sensing to Rel-16 NR sidelink resource allocation mode 2; and (2) taking Rel-14 as the baseline does not preclude introducing a new solution to reduce power consumption for the cases where the baseline cannot work properly.

Another motivation for the sidelink enhancement in Release 17, as mentioned in the work item description, enhanced reliability and reduced latency.

Enhanced reliability and reduced latency allow the support of URLLC-type sidelink use cases in wider operation scenarios. The system level reliability and latency performance of sidelink is affected by the communication conditions such as the wireless channel status and the offered load, and Rel-16 NR sidelink is expected to have limitation in achieving high reliability and low latency in some conditions, e.g., when the channel is relatively busy. Solutions that can enhance reliability and reduce latency are required in order to keep providing the use cases requiring low latency and high reliability under such communication conditions.

Another objective of the Release 17 sidelink enhancement work item is to study the feasibility and benefits of enhancements to resource allocation mode 2, wherein a set of resources can be determined at a UE-A and sent to a UE-B, and the UE-B takes into account this set for its own transmission.

Study the feasibility and benefit of the enhancement(s) in mode 2 for enhanced reliability and reduced latency in consideration of both PRR and PIR defined in 3GPP standard specification, and specify the identified solution if deemed feasible and beneficial. In one example, for an inter-UE coordination, a set of resources is determined at a UE-A. This set is sent to a UE-B in mode 2, and the UE-B takes this into account in the resource selection for its own transmission.

In NR Rel-17, methods for assisted resource selection for sidelink transmissions are considered that mitigate and reduce a probability of resource collisions among UEs, wherein a UE can receive RSAI or IUC message from other UEs in the UE's vicinity, the information received assists the UE in selecting sidelink resources for the UE's sidelink transmission and minimizes the probability of collision with other sidelink transmissions.

The present disclosure provides signaling aspects for sending resource selection assistance information/inter-UE co-ordination information/sensing information from a first UE (e.g., UE-A) to a second UE (e.g., UE-B). In the present disclosure, signaling aspects related to sending a request for resource selection assistance information from the second UE to the first UE is provided. In the present disclosure, the information content of the signaling message and signaling structure of the signaling message is provided.

3GPP Release 16 is the first NR release to include sidelink through work item "5G V2X with NR sidelink," the mechanisms introduced focused mainly on vehicle-to-everything (V2X), and can be used for public safety when the service requirement can be met. Release 17 extends sidelink support to more use cases through work item "NR Sidelink enhancement."

One of the motivations for the sidelink enhancement in Release 17, as mentioned in the work item description of 3GPP, is enhanced reliability and reduced latency. One of the objectives of the Release 17 sidelink enhancement work item, as described in the WID of 3GPP, is to introduce inter-UE coordination by having a set of resources determined at a first UE (e.g., UE-A) be indicated to a second UE (e.g., UE-B), and a UE-B takes into account this information for the SL transmission.

In one scheme, a UE-A sends resource selection assistance information (RSAI) or inter-UE co-ordination (IUC) information consisting of preferred or non-preferred resources to a UE-B. The transmission of RSAI (Inter UE co-ordination information (IUC)) can be based on a condition at the UE-A or based on an explicit request received by the UE-A from the UE-B. In this disclosure, the content of the signal structure of a message used by the UE-B to request RSAI (IUC) from the UE-A and a message from the UE-A to the UE-B conveying the RSAI (IUC) are provided.

The present disclosure relates to a 5G/NR communication system. The present disclosure provides the content and structure of signaling messages: (1) a request from a second UE (e.g., UE-B) to a first UE (e.g., UE-A) to send the RSAI; and (2) a RSAI message from a UE-A to a UE-B.

In Rel-16, the SL Control Information is sent in two parts or stages. A first part or stage is sent using the physical SL control channel (PSCCH). The second part or stage is sent using the physical SL shared channel (PSSCH). There are different formats for the second stage SCI, the format of the second stage SCI is indicated in the first stage SCI by the field "2$^{nd}$ stage SCI format." This is a two-bit field that can indicate up to 4 different second stage SCI formats. In Rel-16, only two second stage SCI formats are introduced as indicated in TABLE 1, leaving two additional second stage SCI formats that can be defined for future use.

TABLE 1

2$^{nd}$ stage SCI formats

| Value of "2$^{nd}$ stage SCI format" Field | 2$^{nd}$ stage SCI format |
|---|---|
| 00 | SCI format 2-A |
| 01 | SCI format 2-B |
| 10 | Reserved |
| 11 | Reserved |

In the present disclosure, a new second stage SCI format is used for the RSAI request and RSAI message. The same format is used for both the RSAI request and RSAI message. For example, this second stage SCI format can have a value of "10" being indicated in the "2$^{nd}$ stage SCI format" field of the first stage SCI. In this disclosure, this SCI format is referred to as SCI format 2-C.

To distinguish the RSAI (IUC) request and RSAI (IUC) message in-band signaling is used in the second stage SCI. For example, a field "identifier of 2$^{nd}$ stage SCI format" is introduced in the second stage SCI. This can be a one-bit field. For example, as illustrated in TABLE 2, a value of "0"

can indicate RSAI message and value of "1" can indicate RSAI Request, or vice versa, i.e., as illustrated in TABLE 3, a value of "0" can indicate RSAI request and a value of "1" can indicate "RSAI" message.

TABLE 2

A first example of type of message carried by $2^{nd}$ stage SCI format for SCI format 2-C

| Value of "Identifier of $2^{nd}$ stage SCI format" Field | Type of second stage SCI Message |
|---|---|
| 0 | RSAI Message |
| 1 | RSAI Request |

TABLE 3

A second example of type of message carried by $2^{nd}$ stage SCI format for SCI format 2-C

| Value of "Identifier of $2^{nd}$ stage SCI format" Field | Type of second stage SCI Message |
|---|---|
| 0 | RSAI Request |
| 1 | RSAI Message |

In the following components and examples, a first UE or UEs, e.g., UE-A, also referred to as the controlling UE (or UEs) provides a set of resources (e.g., preferred resources and/or non-preferred resources) and possibly other Resource Selection Assistance Information, referred to collectively as RSAI, to a second UE or UEs, e.g., a UE-B, also referred to as controlled UE (or UEs). The controlled UE (i.e., the second UE or UE-B) selects and reserves a resource or multiple resources from/based on the set of resources provided in the RSAI from the controlling UE (i.e., the first UE or UE-A). This is illustrated in FIG. 6.

Figure 6:
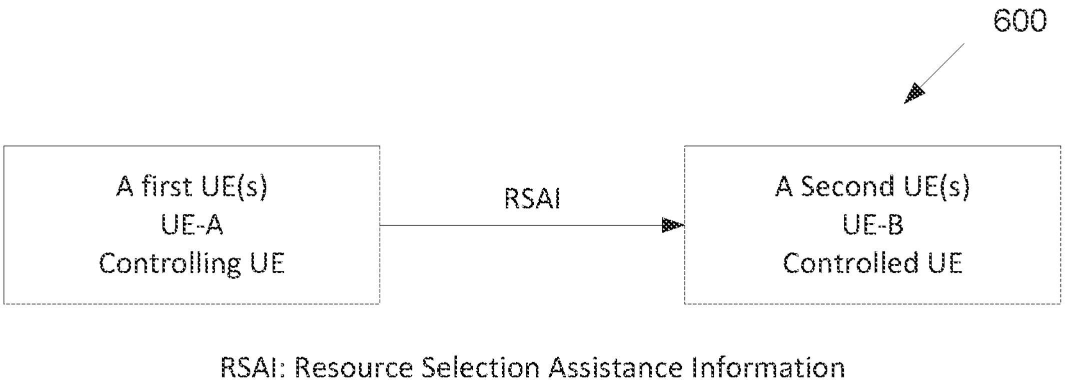
FIG. 6 illustrates an example of resource selection assistance information (RSAI) between UEs according to embodiments of the present disclosure.

FIG. 6 illustrates an example of RSAI (IUC) between UEs 600 according to embodiments of the present disclosure. An embodiment of the RSAI between UEs 600 shown in FIG. 6 is for illustration only.

In some examples, the second UE, i.e., a UE-B or the controlled UE can generate an explicit request from RSAI to the first UE, i.e., a UE-A or the controlling UE-A. In response to the RSAI request from the UE-B, a UE-A sends RSAI message to the UE-B. This is illustrated in FIG. 7.

Figure 7:
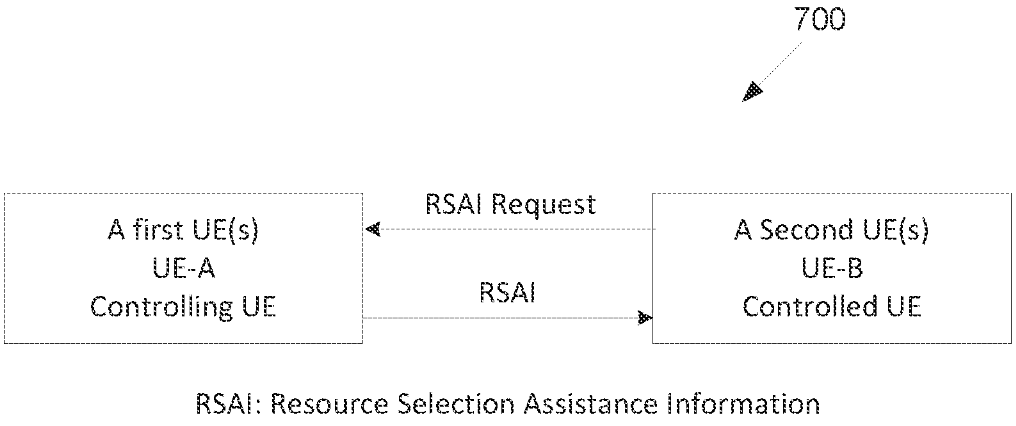
FIG. 7 illustrates an example of RSAI (Inter-UE coordination IUC) request and RSAI (IUC) message according to embodiments of the present disclosure.

FIG. 7 illustrates an example of RSAI (IUC) request and RSAI (IUC) message 700 according to embodiments of the present disclosure. An embodiment of the RSAI request and RSAI 700 shown in FIG. 7 is for illustration only.

In one example, a UE-B sends the RSAI request to the intended receiver of a UE-B transmission, i.e., a UE-A is the intended receiver of a UE-B transmission. In another example, a UE-B can send the RSAI request to any UE whether or not the UE is the intended receiver of a UE-B transmission, for example, a UE-A can be a roadside unit (RSU), a group (platoon) leader, or any other UE.

In some other examples, the first UE, i.e., a UE-A or the controlling UE does not receive an explicit request for RSAI from the second UE, i.e., a UE-B or the controlled UE. The UE-A generates the RSAI based on a condition. Examples of conditions can be: (1) condition based on higher layer configuration, for example this can be for a special type of UE such as high energy UE that are connected to a power supply; (2) condition based when the CBR exceeds a certain level; and/or (3) condition based when the HARQ error rate exceeds a certain level.

The RSAI from a first UE, i.e., a UE-A or a controlling UE can be transmitted: (1) as a broadcast message to all UEs in the vicinity of UE-A; (2) as a groupcast message to a set of UEs in the vicinity of the controlling UE, within a (pre-) configured set for example, the set of UEs can be addressed by a common identifier; and/or (3) as a unicast message to a single UE.

The RSAI for a controlling UE can be received by a controlled UEs as well as possibly other controlling UEs.

The RSAI request from a second UE, i.e., a UE-B or a controlled UE can be transmitted: (1) as a broadcast RSAI request to all UEs in the vicinity of UE-A; (2) as a groupcast RSAI request to a set of UEs in the vicinity of the controlling UE, within a (pre-)configured set for example, the set of UEs can be addressed by a common identifier. For example, if a UE-B has a groupcast transmission, the UE-B transmits the RSAI request to the UEs that are a target receiver of the groupcast transmission; and/or (3) as a unicast RSAI request to a single UE. In one example, the single UE is a target receiver of a transmission from the UE-B. In another example, the single UE can be any UE.

A resource pool can be (pre-)configured to support inter-UE co-ordination (RSAI). A UE may be further (pre-) configured and/or has a UE capability to support providing RSAI (e.g., inter-UE coordination) messages, i.e., the UE can be a UE-A. A UE may be further (pre-) configured and/or has a UE capability to support receiving RSAI (e.g., inter-UE coordination) messages, i.e., the UE can be a UE-B.

A resource pool can be (pre-)configured to support inter-UE co-ordination request (RSAI request). A UE (e.g., UE-B) may be further (pre-)configured and/or has a UE capability to support transmitting RSAI request (e.g., inter-UE coordination request). A UE (e.g., UE-A) may be further (pre-) configured and/or has a UE capability to support receiving RSAI request (e.g., inter-UE coordination request).

A UE can be: (1) a UE-A only, i.e., providing RSAI message, and possibly receiving RSAI request, (2) a UE-B only, i.e., receiving RSAI message, and possibly transmitting RSAI request, or (3) both a UE-A and a UE-B.

Figure 8:
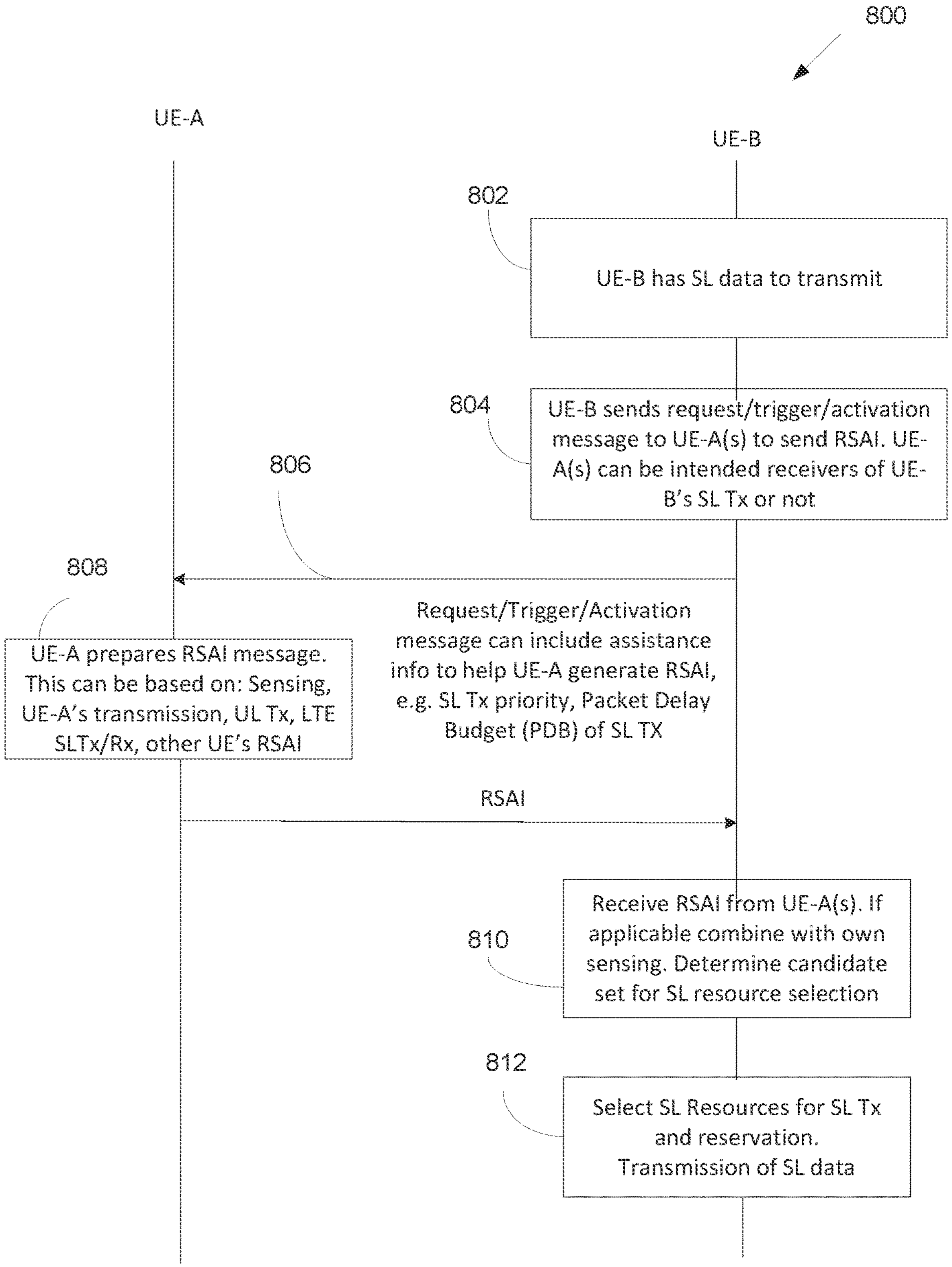
FIG. 8 illustrates a flowchart of a method for an explicit request/trigger/activation based inter-UE co-ordination procedure according to embodiments of the present disclosure.

FIG. 8 illustrates a flowchart of a method 800 for an explicit request/trigger/activation based inter-UE co-ordination procedure according to embodiments of the present disclosure. An embodiment of the method 800 shown in FIG. 8 is for illustration only. The method 800 may be performed by UEs (e.g., 111-116 as illustrated in FIG. 1). One or more of the components illustrated in FIG. 8 can be implemented in specialized circuitry configured to perform the noted functions or one or more of the components can be implemented by one or more processors executing instructions to perform the noted functions.

FIG. 8 is an example of an explicit request/trigger/activation based inter-UE co-ordination procedure, wherein, a UE-B sends a request (trigger) to UE-A(s) to provide RSAI when the UE-B has SL data to transmit. A UE-A provides the RSAI message in response to the explicit/trigger/activation message from the UE-B. In a further example, the UE-B can send a deactivation message to stop the transmission of the RSAI message.

As illustrated in FIG. 8, in step 802, a UE-B has SL data to transmit. In step 804, the UE-B sends request/trigger/activation message to UE-A(s) to send RSAI. UE-A(s) can be intended receivers of UE-B's SL Tx or not. In step 806, the UE-B sends a request/trigger/activation message that can include assistance info to help UE-A generate RSAI, e.g., SL Tx priority, packet delay budget (PDB) of SL TX. In step 808, the UE-A prepares RSAI message. This can be based on sensing, a UE-A's transmission, UL Tx, LTE SLTx/Rx, and other UE's RSAI. In step 810, the UE-B receives RSAI from the UE-A(s). If applicable combine with own sensing. Determine candidate set for SL resource selection. In step 812, the UE-B select SL resources for SL Tx and reservation. The UE-B performs transmission of SL data.

In response to a trigger/activation message from a UE-B, a UE-A can one of: (1) send RSAI once, or N times to the UE-B, (N>1); and (2) send RSAI periodically to the UE-B until the UE-A receives a deactivation message from the UE-B to stop sending RSAI.

Figure 9:
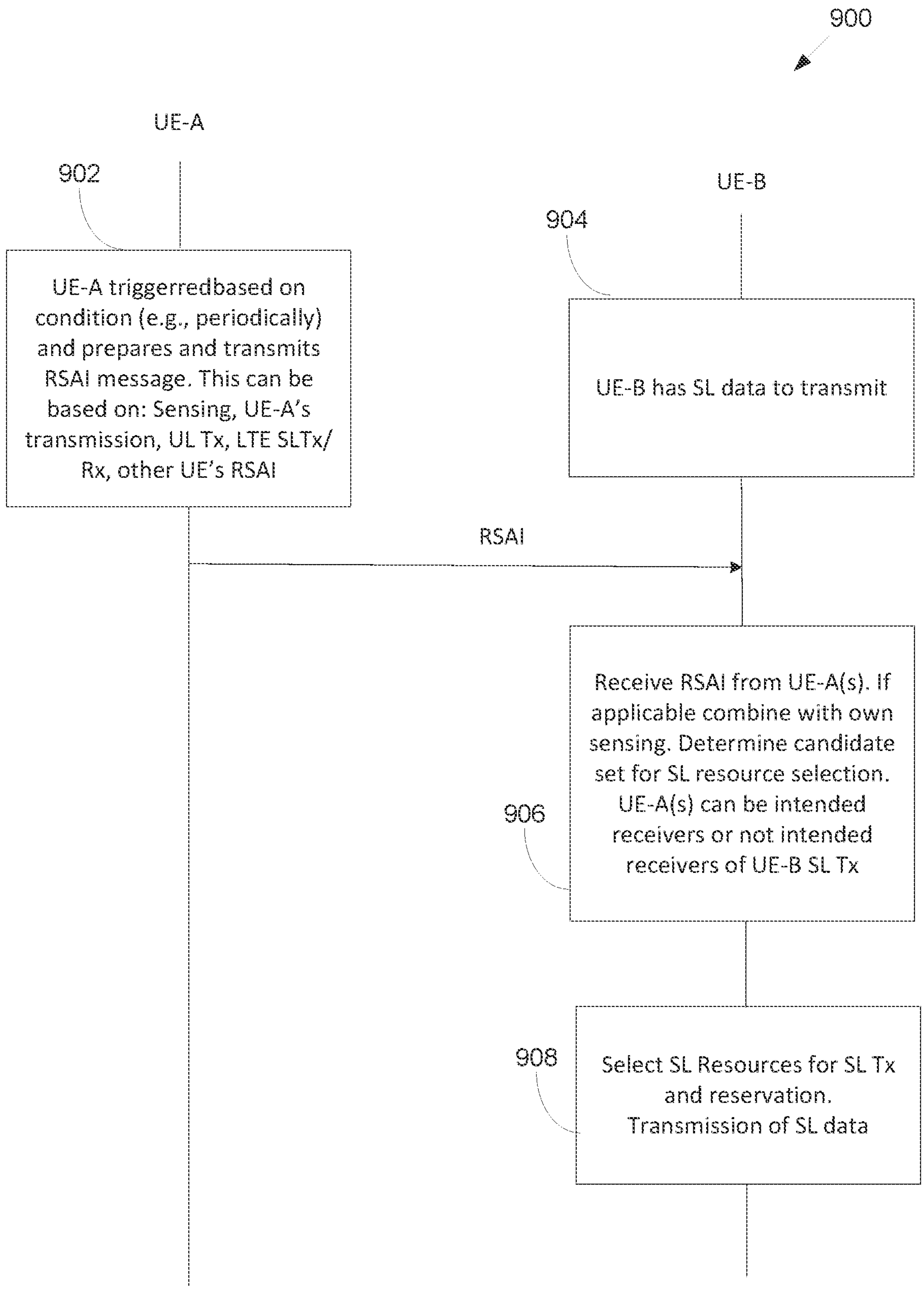
FIG. 9 illustrates a flowchart of a condition-based inter-UE co-ordination procedure according to embodiments of the present disclosure.

FIG. 9 illustrates a flowchart of a method 900 for a condition-based inter-UE co-ordination procedure according to embodiments of the present disclosure. An embodiment of the method 900 shown in FIG. 9 is for illustration only. The method 900 may be performed by UEs (e.g., 111-116 as illustrated in FIG. 1). One or more of the components illustrated in FIG. 9 can be implemented in specialized circuitry configured to perform the noted functions or one or more of the components can be implemented by one or more processors executing instructions to perform the noted functions.

FIG. 9 is an example of a condition-based inter-UE co-ordination procedure (e.g., periodic triggering of inter-UE co-ordination (RSAI) message). A UE-A provides inter-UE co-ordination message (RSAI message) based on a condition (e.g., periodic triggering) to neighboring UE-B's. When a UE-B has data to transmit, the UE-B uses the RSAI message from UE-A(s) for the SL resource selection. The UE-A can be an infra-structure UE, e.g., RSU or a group leader for a group of UEs, or a UE configured to provide inter-UE co-ordination information.

As illustrated in FIG. 9, in step 902, a UE-A triggers based on condition (e.g., periodically) and prepares and transmits RSAI message. This can be based on sensing, UE-A's transmission, UL Tx, LTE SLTx/Rx, or other UE's RSAI. In step 904, a UE-B has SL data to transmit. In step 906, the UE-B receive RSAI from UE-A(s). If applicable combine with own sensing. Determine candidate set for SL resource selection. The UE-A(s) can be intended receivers or not intended receivers of UE-B SL Tx. In step 908, the UE-B selects SL Resources for SL Tx and reservation. The UE-B performs transmission of SL data.

A second stage SCI format 2-C as described earlier can be used for RSAI request. In-band indication in the second stage SCI format (e.g., SCI format 2-C) is used to distinguish between RSAI request and RSAI message as described. The content of the payload of the second stage SCI can include the fields of TABLE 4.

TABLE 4

Example of content of second stage SCI for RSAI request

| Parameter | Description | Size in bits |
|---|---|---|
| Identifier for SCI format | Determines whether the second stage SCI is for RSAI (IUC) or RSAI (IUC) request. For example, "0" for RSAI (IUC) message and "1" for RSAI (IUC) request | 1 bit |
| Source Layer-1 ID | Least significant 8-bits (or 16-bits) of source Layer-2 ID of UE-B | 8 bits (or 16-bits) |
| Destination Layer-1 ID | Least significant 16-bits of destination ID of UE-A. | 16 bits |
| Zone ID | Zone ID of UE-B. Can be an optional parameter. | 12 bits |
| Communication Range | Can be an optional parameter | 4 bits |
| Resource Type | Indicates preferred or non-preferred resources | 1 bit |
| Latency bound | This field can indicate one of: Remaining packet delay budget Start of resource selection window for RSAI and end of resource selection window for RSAI. End location can be an offset relative to start location | 10 bits |
| Resource size | The resource size in number of sub-channels. The maximum number of sub-channels is 27 | Up to 5 bits |
| Priority | This is the priority of the PSCCH/PSSCH transmission for which resources are being requested by the RSAI request | 3 bits |
| Resource reservation period | This is the resource reservation interval of the PSCCH/PSSCH transmission for which resources are being requested by the RSAI | Up to 4 bits |
| Padding | If needed. This is to align the size of the second stage SCI for RSAI (IUC) request with the second stage SCI for RSAI (IUC information). The smaller of the two is padded to have size equal to the larger of the two | Variable |

In one example, for TABLE 4, the source layer-1 ID is the 8 least significant bits of the source layer-2 ID. In another example, the source layer-1 ID is the 16 least significant bits of the source layer-2 ID.

In TABLE 4, the "latency bound" can be given by one: (1) the remaining packet delay budget. The remaining packet delay budget is in units of 0.5 ms and has a size of 10 bits. The remaining packet delay budget can be relative to the RSAI request time; and (2) The start and the end of the resource selection window for RSAI.

In such example, the start of the resource selection window can be indicated by 1 (or 2 bits). If 1 bit is used for the start of the resource selection window, two time locations relative to the RSAI request time or relative to the RSAI message time are used are specified by system specifications and/or configured by higher layer, the 1 bit in the second stage SCI is used to indicate one of these times. If 2 bits are used for the start of the resource selection window, four time locations relative to the RSAI request time or relative to the RSAI message time are used are specified by system specifications and/or configured by higher layer, the 2 bits in the second stage SCI are used to indicate one of these times.

In such example, the end of the resource selection window can be indicated by 9 (or 8 bits). If 9 bits are used, the end of the resource selection window is in units of sub-frames (1 ms) relative to the RSAI request time or relative to the RSAI message time. If 8 bits are used, the end of the resource selection window is in units of two-sub-frames (each 1 ms) relative to the RSAI request time or relative to the RSAI message time.

In TABLE 4, the number of bits for the resource size depends on the size of the BWP part in PRBs, and number of PRBs per sub-channel. Let the number of PRBs in SL BWP be $$N_{BWP}^{size}.$$

Let the size the sub-channel in PRBs be sl-SubChannelSize $n_{subCHsize}$ The resource size in bits can be given by $$\left\lceil \log_2\left(\frac{N_{BWP}^{size}}{n_{subCHsize}}\right)\right\rceil \text{ bits or } \left\lceil \log_2\left\lfloor\frac{N_{BWP}^{size}}{n_{subCHsize}}\right\rfloor\right\rceil \text{ bits.}$$

In TABLE 4, in one example, the "priority" field for the PSCCH/PSSCH transmission for which a UE-B is requesting RSAI (inter-UE co-ordination information) is included the second stage SCI for RSAI request. In another example, the "priority" field for the PSCCH/PSSCH transmission for which the UE-B is requesting RSAI (inter-UE co-ordination information) is not included in the second stage SCI for RSAI request, instead the "priority" field of the first stage SCI is used to provide the "priority."

In TABLE 4, in one example, the "resource reservation period" field for the PSCCH/PSSCH transmission for which a UE-B is requesting RSAI (inter-UE co-ordination information) is included the second stage SCI for RSAI request. In another example, the "resource reservation period" field for the PSCCH/PSSCH transmission for which the UE-B is requesting RSAI (inter-UE co-ordination information) is not included in the second stage SCI for RSAI request, instead the "resource reservation period" field of the first stage SCI is used to provide the "resource reservation period."

The size of the "resource reservation period" is given by: $\lceil \log_2 N_{rsv\_period}\rceil$ bits where $N_{rsv\_period}$ is the number of entries in the higher layer parameter sl-ResourceReservePeriodList, if higher layer parameter sl-MultiReserveResource is configured, 0 bit otherwise.

In one example, SCI format 2-C RSAI request is illustrated in TABLE 5.

For the RSAI (IUC) request, the following fields are provided: (1) source ID and destination ID: Similar to SCI format 2-A and 2-B, the source ID has 8 bits and destination ID has 16 bits; (2) a one-bit field is needed to differentiate between RSAI message and RSAI request; (3) zone ID; (4) resource type: 1 bit to indicate preferred or non-preferred resources; (5) priority: Priority of the SL data for which inter-UE co-ordination information is being requested. Size is 3 bits; (6) number of subchannels of SL data transmission. Size is $$\lceil \log_2 N_{subChannel}^{SL}\rceil \text{ bits;}$$

(7) resource reservation period of the SL data for which inter-UE co-ordination information is being requested $\lceil \log_2 N_{rsv\_period}\rceil$ bits; (8) starting time of resource selection window: This is a combination of DFN index and slot index. The size of this field is 14+μ bits, where μ is the sub-carrier spacing configuration, μ={0, 1, 2, 3} for sub-carrier spacing {15, 30, 60, 120} kHz respectively; and (9) ending time of resource selection window: The ending time is relative to the starting time of the resource selection window and is in units of 0.5 ms with a size of 10 bits.

TABLE 5

RSAI request structure with maximum size for each field

| Field | Size (Preferred resources) |
|---|---|
| Source ID | 8 |
| Destination ID | 16 |
| RSAI Message/Request Indicator | 1 |
| Zone ID | 12 |
| Cast Type | N/A (used for BC/GC only) |
| Resource Type | 1 |
| Priority | 3 |
| Number of Sub-channels | 5 or $\lceil \log_2 N_{subChannel}^{SL}\rceil$ |
| Resource reservation period | 4 or $\lceil \log_2 N_{rsv\_period}\rceil$ |
| Start of Window | 17 or 14 + μ |
| End of Window | 10 |
| Padding | 66 |
| Total | 139 |

The payload of the second stage SCI (e.g., SCI format 2-C) passes through channel coding stages are described in 3GPP standard specification: (1) first a CRC is attached to the payload as described in TS 38.212; (2) a next channel coding is performed as described in TS 38.212; and (3) a next rate matching is performed. The details of rate matching are described later in this disclosure.

In one example, the inter-UE co-ordination request (RSAI request) is sent in a second stage SCI format without a SL-shared channel (SL-SCH). i.e., the PSSCH only includes the second stage SCI format.

As the PSSCH only includes the second stage SCI (there is no SL-SCH). The output of rate matching as described above may fill the resource elements of PSSCH. The resource element of PSSCH available for second stage SCI transmission are given by:

$$RE^{PSSCH} = \sum_{l=0}^{N_{symbol}^{PSSCH}-1} M_{sc}^{SCI2}(l)$$

Where: (1)

$$N_{symbol}^{PSSCH}$$

is the number of symbols allocated to PSSCH; (2)

$$M_{sc}^{SCI2}(l)$$

is the number of resource elements that can be used for transmission of the second stage SCI in PSSCH symbol l;

and (3) the resource elements used for the second stage SCI exclude resource elements used for PSSCH DM-RS, PT-RS and PSCCH (including PSCCH information resource elements and PSCCH DM-RS resource elements).

For a second stage SCI, QPSK modulation is used. The UE is not expected to have more than 4096 coded-bits after rate matching. With QPSK modulation, this may correspond to 2048 coded modulation symbols. If the number of available PSSCH REs for second stage SCI, as given by $RE^{PSSCH}$, is greater than 2048 REs, fewer PSSCH symbols are used for the transmission of the second stage SCI such that number of available REs is less than 2048 REs. The number of PSSCH symbols used the second stage SCI, X, is determined such that if $$RE^{PSSCH} \leq 2048,\ X = N_{symbol}^{PSSCH},$$

else, X is the largest integer such that $$\sum_{l=0}^{N_{symbol}^{PSSCH}-1} M_{sc}^{SCI2}(l) \leq 2048 \text{ and } X \geq 1.$$

Rate matching is performed as described in TS 38.212, except that $$Q'_{SCI2} = \sum_{l=0}^{X-1} M_{sc}^{SCI2}(l).$$

The symbols between X and $$N_{symbol}^{PSSCH} - 1$$

are not used for transmission (i.e., no transmission for PSSCH in these symbols). Only the first X PSSCH symbols are used for the transmission of the second stage SCI.

The output of rate matching is scrambled as described in TS 38.211.

The output of scrambling is modulated using QPSK modulation as described in TS 38.211.

A single layer is used for the second stage SCI. Layer mapping of the modulated symbols is as described in TS 38.211.

Precoding of the output of layer mapping is as described in TS 38.211.

For each of the antenna ports used for the transmission of the PSSCH, the block of complex-valued symbols $$z^{(p)}(0), \ldots, z^{(p)}(M_{symb}^{ap} - 1)$$

may be multiplied with the amplitude scaling factor $$\beta_{DMRS}^{PSSCH}$$

in order to conform to the transmit power as specified in TS 38.213 and mapped to resource elements $(k', l)_{p,\mu}$ in the virtual resource blocks assigned for transmission, where k'=0 is the first sub-carrier in the lowest-numbered virtual resource block assigned for transmission.

The following examples illustrate how to map the pre-coded symbols of each antenna ports to the available resource elements for the second stage SCI.

In one example, the complex-valued symbols corresponding to the second stage SCI are mapped in increasing order of first the index k' over the assigned virtual resource blocks and then the index l, starting from the first PSSCH symbol carrying an associated DM-RS. After mapping to the resource elements of symbol X−1, the index l wraps around to l=0 and continues with the mapping the complexed-valued symbols. The resource elements used for the second stage SCI in the PSSCH symbols exclude resource elements used for PSSCH DM-RS, PT-RS and PSCCH (including PSCCH information resource elements and PSCCH DM-RS resource elements). This is illustrated in FIG. 10.

Figure 10:
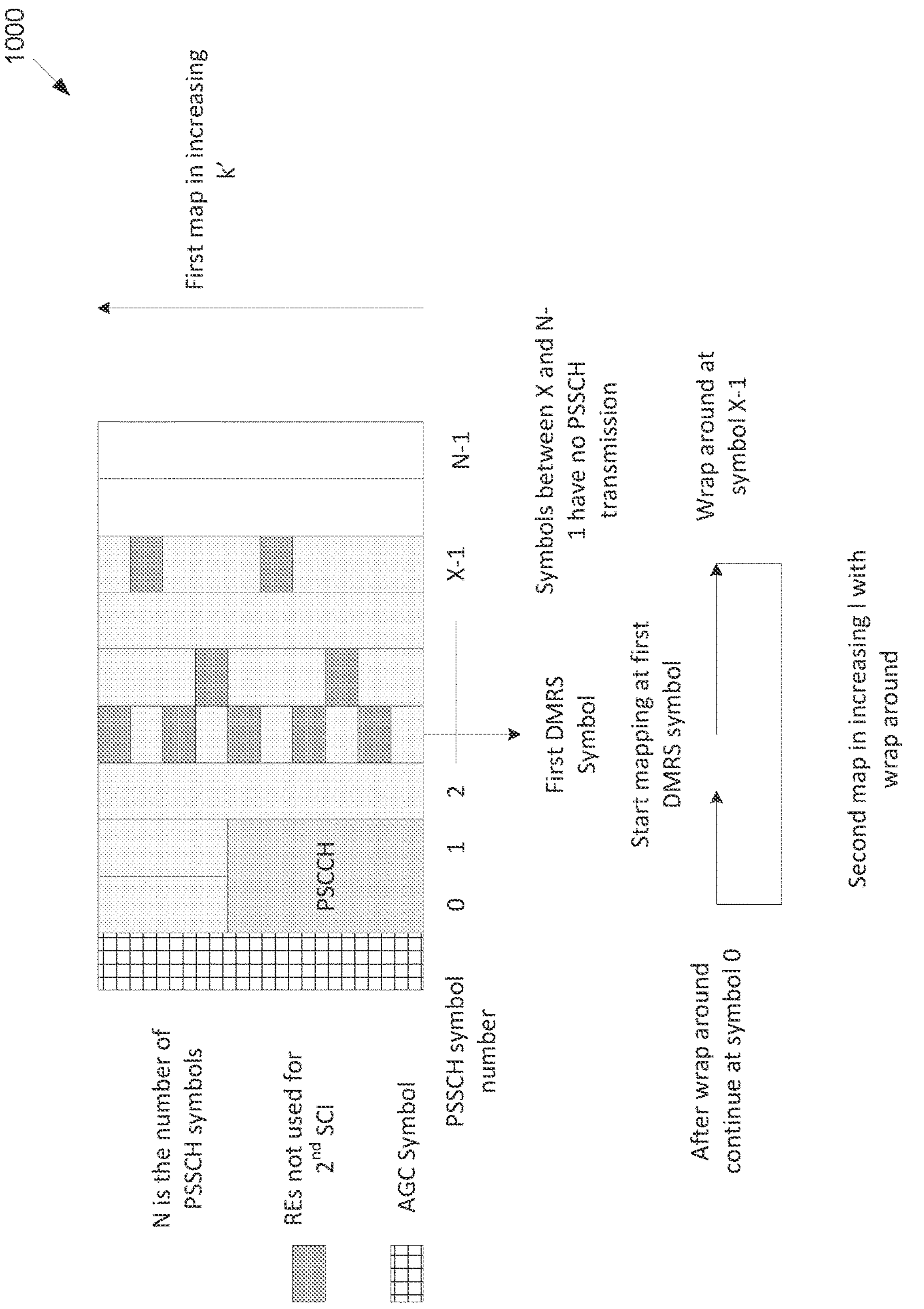
FIG. 10 illustrates an example of resource elements according to embodiments of the present disclosure.

FIG. 10 illustrates an example of resource elements 1000 according to embodiments of the present disclosure. An embodiment of the resource elements 1000 shown in FIG. 10 is for illustration only.

In another example, the complex-valued symbols corresponding to the second stage SCI are mapped in increasing order of first the index k' over the assigned virtual resource blocks and then the index l, starting from the first PSSCH symbol with index l=0, this continues until the last PSSCH symbol X−1. The resource elements used for the second stage SCI in the PSSCH symbols exclude resource elements used for PSSCH DM-RS, PT-RS and PSCCH (including PSCCH information resource elements and PSCCH DM-RS resource elements). This is illustrated in FIG. 11.

Figure 11:
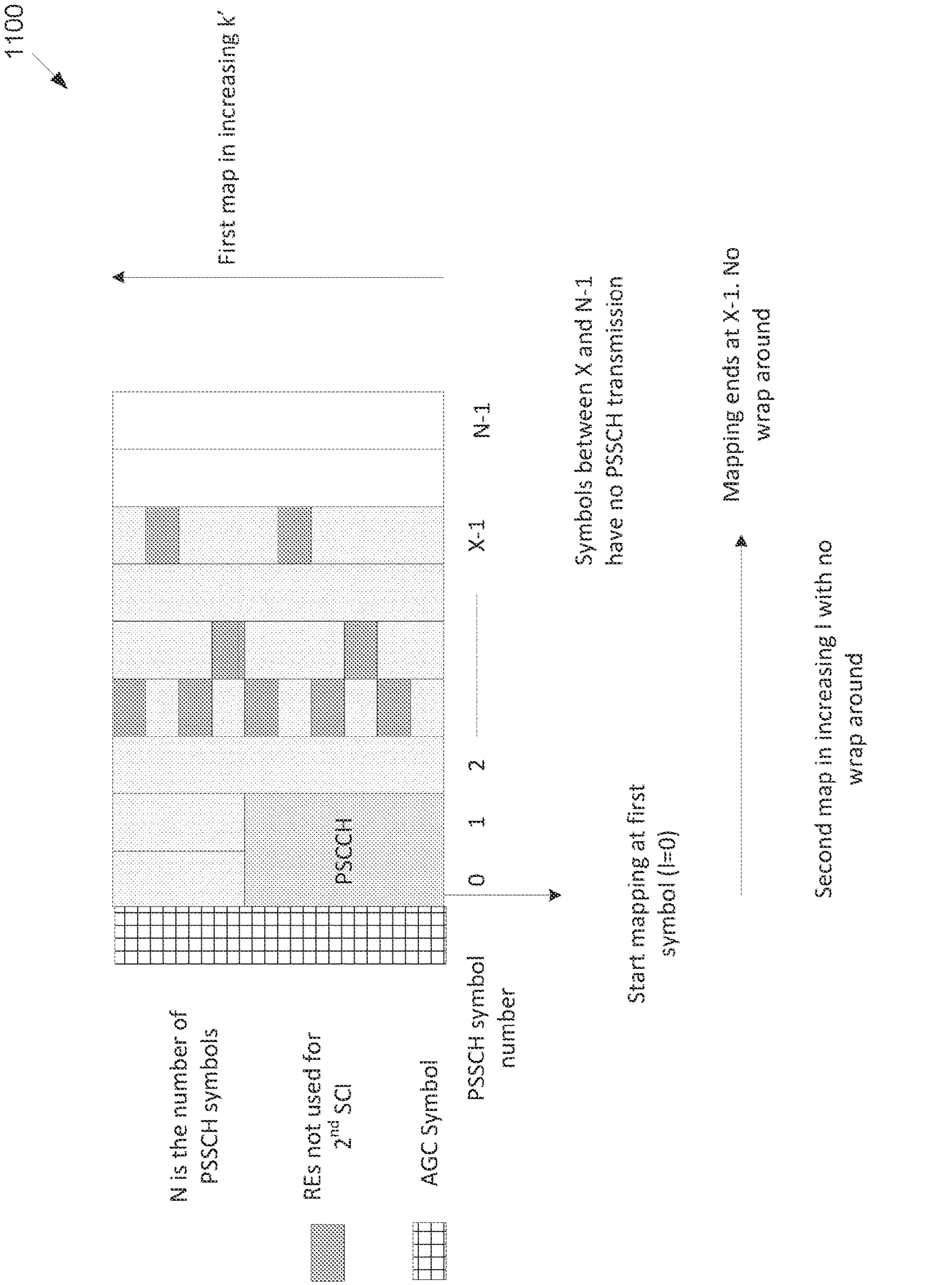
FIG. 11 illustrates another example of resource elements according to embodiments of the present disclosure.

FIG. 11 illustrates another example of resource elements 1100 according to embodiments of the present disclosure. An embodiment of the resource elements 1100 shown in FIG. 11 is for illustration only.

In another example, the inter-UE co-ordination request (RSAI request) is sent in a second stage SCI format without a SL-shared channel (SL-SCH). i.e., the PSSCH only includes the second stage SCI format. The UE determines the target code rate R as described in TS 38.214 using the modulation and coding field included in the first stage SCI. The UE determines the number of coded bits, $Q'_{SCI2}$, for the second stage SCI carrying the RSAI request as described in TS 38.212.

In one example, the parameter γ is selected as described in TS 38.212.

In another example, the parameter γ is selected as the number of vacant resource elements in the last symbol of the second stage SCI.

In another example, if the last symbol of the second stage SCI is not a DMRS symbol, and there is at least one vacant symbol in the PSSCH, a DMRS symbol is appended to the last symbol of the second stage SCI, the parameter γ is selected as the number of vacant resource elements in the last symbol of the send stage SCI and the appended DMRS symbol.

Rate matching is performed as described in TS 38.212. The output of rate matching is scrambled as described in TS 38.211. The output of scrambling is modulated using QPSK modulation as described in TS 38.211.

A single layer is used for the second stage SCI. Layer mapping of the modulated symbols is as described in TS 38.211.

Precoding of the output of layer mapping is as described in TS 38.211.

For each of the antenna ports used for the transmission of the PSSCH, the block of complex-valued symbols $$z^{(p)}(0), \ldots, z^{(p)}(M_{symb}^{ap}-1)$$

may be multiplied with the amplitude scaling factor $$\beta_{DMRS}^{PSSCH}$$

in order to conform to the transmit power as specified in TS 38.213 and mapped to resource elements $(k', 1)_{p,\mu}$ in the virtual resource blocks assigned for transmission, where k'=0 is the first sub-carrier in the lowest-numbered virtual resource block assigned for transmission.

The following examples illustrate how to map the pre-coded symbols of each antenna ports to the available resource elements for the second stage SCI.

In one example, the complex-valued symbols corresponding to the second stage SCI are mapped in increasing order of first the index k' over the assigned virtual resource blocks and then the index l, starting from the first PSSCH symbol carrying an associated DM-RS, this continues until all the second stage SCI REs are mapped to resource elements. The resource elements used for the second stage SCI in the PSSCH symbols exclude resource elements used for PSSCH DM-RS, PT-RS and PSCCH (including PSCCH information resource elements and PSCCH DM-RS resource elements). This is illustrated in Example 1 of FIG. 12.

Figure 12:
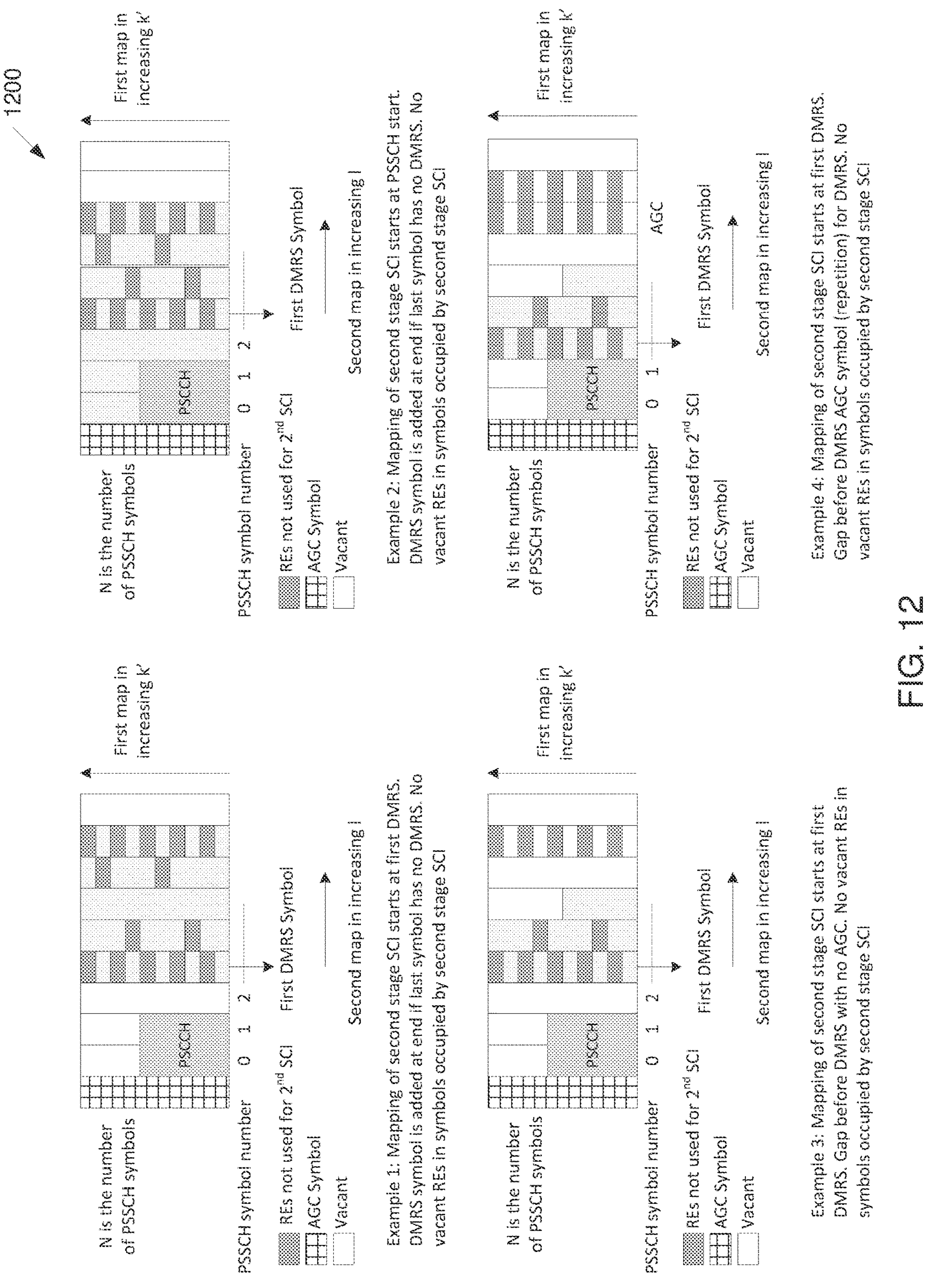
FIG. 12 illustrates yet another example of resource elements according to embodiments of the present disclosure.

FIG. 12 illustrates yet another example of resource elements 1200 according to embodiments of the present disclosure. An embodiment of the resource elements 1200 shown in FIG. 12 is for illustration only.

In another example, the complex-valued symbols corresponding to the second stage SCI are mapped in increasing order of first the index k' over the assigned virtual resource blocks and then the index l, starting from the first PSSCH symbol with index l=0, this continues until all the second stage SCI REs are mapped to resource elements. The resource elements used for the second stage SCI in the PSSCH symbols exclude resource elements used for PSSCH DM-RS, PT-RS and PSCCH (including PSCCH information resource elements and PSCCH DM-RS resource elements). This is illustrated in Example 2 of FIG. 12.

In one example, in a symbol with REs occupied, the energy per resource element is $EPRE_{all}$. In a symbol with V vacant resource elements and O occupied resource elements, the EPRE of the occupied resource elements ($EPRE_O$) is boasted by $$\frac{O+V}{O}. \text{ i.e., } EPRE_O = \frac{O+V}{O} EPRE_{all},$$

or in dBm $$EPRE_O(\text{dBm}) = 10\log_{10}\frac{O+V}{O} + EPRE_{all}(\text{dBm}).$$

In a symbol with all resource elements vacant there is no transmission.

In another example, in a symbol with vacant REs, the ERRE of the occupied REs is not boasted.

In another example, if a DMRS symbol has a gap before it, an AGC symbol is included. The AGC symbol is the repetition of the DMRS symbol before the DMRS symbol. This is illustrated in Example 4 of FIG. 12.

In another example, if a DMRS symbol has a gap before it, there is no repetition of the DMRS symbol. The DMRS is transmitted without repetition. This is illustrated in Example 3 of FIG. 12.

In another example, the inter-UE co-ordination request (RSAI request) is sent in a second stage SCI format with a SL-shared channel (SL-SCH). i.e., the PSSCH includes a second stage SCI format and a SL-SCH. The SL-SCH only includes MAC CE that includes the RSAI request. The rate matching for the second stage SCI is performed as described in TS 38.212. The second stage SCI and the SL-SCH are multiplexed as described in TS 38.212. The scrambling, modulation, layer mapping, precoding and mapping to resource elements are as described in TS 38.211.

In one example, only QPSK is used to modulate the symbols corresponding to the SL-SCH. In another example, other modulation schemes such 16 QAM, 64 QAM and 256 QAM can modulate the symbols corresponding to SL-SCH in addition to QPSK. In one example, only one layer can be used for RSAI request message, in another example, one or two layers can be used RSAI request message.

In one example, HARQ re-transmissions are disabled for the SL-SCH channel carrying the RSAI request. Each transmission of the RSAI request is independent of the previous transmissions.

In another example, HARQ re-transmissions are enabled for the SL-SCH channel carrying the RSAI request. A transmission of the RSAI request can be a re-transmission of the previous RSAI request.

In one example, the new data indicator field is included in the second stage SCI (e.g., SCI format 2C), this field is toggled for each new RSAI request transmission in the SL-SCH, In one example, the "redundancy version" (RV) field is included in the second stage SCI (e.g., SCI format 2C).

In another example, the "redundancy version" (RV) field is not included in the second stage SCI (e.g., SCI format 2C). A fixed RV is used (e.g., RV 0).

In one example, when there is a re-transmission of the RSAI request, the RSIA request in the second stage SCI (e.g., SCI format 2C) is not updated, i.e., the same RSAI request is re-transmitted in both the second stage SCI (e.g., SCI format 2C) and the corresponding SL-SCH the same as the previous one.

In another example, when there is a re-transmission of the RSAI request, the RSIA request in the second stage SCI (e.g., SCI format 2C) can be updated, i.e., the same RSAI request is re-transmitted in SL-SCH, but the corresponding second stage SCI (e.g., SCI format 2C) in the re-transmitted RSAI request can be updated.

In another example, the inter-UE co-ordination request (RSAI request) is sent in a second stage SCI format with a SL-shared channel (SL-SCH). i.e., the PSSCH includes a second stage SCI format and a SL-SCH. The SL-SCH includes dummy data (i.e., data carries no useful information just for purpose of including a SL-SCH with the second stage SCI). The rate matching for the second stage SCI is performed as described in TS 38.212. The second stage SCI and the SL-SCH are multiplexed as described in TS 38.212. The scrambling, modulation, layer mapping, precoding and mapping to resource elements are as described in TS 38.211.

In one example, only QPSK is used to modulate the symbols corresponding to the SL-SCH. In another example, other modulation schemes such 16QAM, 64QAM and 256QAM can modulate the symbols corresponding to SL-SCH in addition to QPSK. In one example, only one layer can be used for RSAI request message, in another example, one or two layers can be used RSAI request message.

In one example, HARQ re-transmissions are disabled for the SL-SCH channel carrying dummy data. Each transmission of the dummy data is independent of the previous transmissions.

In another example, HARQ re-transmissions are enabled for the SL-SCH channel carrying dummy data.

In one example, the new data indicator field is included in the second stage SCI (e.g., SCI format 2C).

In one example, the "redundancy version" (RV) field is included in the second stage SCI (e.g., SCI format 2C).

In another example, the "redundancy version" (RV) field is not included in the second stage SCI (e.g., SCI format 2C). A fixed RV is used (e.g., RV 0).

In another example, the inter-UE co-ordination request (RSAI request) is sent in a second stage SCI format with a SL-shared channel (SL-SCH). i.e., the PSSCH includes a second stage SCI format and a SL-SCH. The SL-SCH includes MAC CE that includes the RSAI request as well as other SL data. The rate matching for the second stage SCI is performed as described in TS 38.212. The second stage SCI and the SL-SCH are multiplexed as described in TS 38.212. The scrambling, modulation, layer mapping, precoding and mapping to resource elements are as described in TS 38.211.

In one example, only QPSK is used to modulate the symbols corresponding to the SL-SCH. In another example, other modulation schemes such 16QAM, 64QAM and 256QAM can modulate the symbols corresponding to SL-SCH in addition to QPSK. In one example, only one layer can be used for RSAI request message, in another example, one or two layers can be used RSAI request message.

In one example, HARQ re-transmissions are disabled for the SL-SCH channel carrying the RSAI request and other SL data. Each transmission of the RSAI request and SL data is independent of the previous transmissions.

In another example, HARQ re-transmissions are enabled for the SL-SCH channel carrying the RSAI request and other SL data. A transmission of the RSAI request and other SL data can be a re-transmission of the previous RSAI request and other SL data.

In one example, the new data indicator field is included in the second stage SCI (e.g., SCI format 2C), this field is toggled for each new RSAI request and SL data transmission in the SL-SCH, In one example, the "redundancy version" (RV) field is included in the second stage SCI (e.g., SCI format 2C).

In another example, the "redundancy version" (RV) field is not included in the second stage SCI (e.g., SCI format 2C). A fixed RV is used (e.g., RV 0).

In one example, when there is a re-transmission of the RSAI request, the RSIA request in the second stage SCI (e.g., SCI format 2C) is not updated, i.e., the same RSAI request is re-transmitted in both the second stage SCI (e.g., SCI format 2C) and the corresponding SL-SCH the same as the previous one.

In another example, when there is a re-transmission of the RSAI request, the RSIA request in the second stage SCI (e.g., SCI format 2C) can be updated, i.e., the same RSAI request is re-transmitted in SL-SCH, but the corresponding second stage SCI (e.g., SCI format 2C) in the re-transmitted RSAI request can be updated.

In another example, the inter-UE co-ordination request (RSAI request) is sent in a second stage SCI format with a SL-shared channel (SL-SCH). i.e., the PSSCH includes a second stage SCI format and a SL-SCH. The SL-SCH includes SL data. The rate matching for the second stage SCI is performed as described in TS 38.212. The second stage SCI and the SL-SCH are multiplexed as described in TS 38.212. The scrambling, modulation, layer mapping, precoding and mapping to resource elements are as described in TS 38.211.

A second stage SCI format 2-C as described earlier can be used for RSAI message. In-band indication in the second stage SCI format (e.g., SCI format 2-C) is used to distinguish between RSAI message and RSAI request as described. The content of the payload of the second stage SCI can include the fields of TABLE 6.

TABLE 6

Example of content of second stage SCI for RSAI message

| Parameter | Description | Size in bits |
|---|---|---|
| Identifier for SCI format | Determines whether the second stage SCI is for RSAI (IUC) or RSAI (IUC) request. For example, "0" for RSAI (IUC) message and "1" for RSAI (IUC) request | 1 bit |
| Source Layer-1 ID | Least significant 8-bits (or 16-bits) of source Layer-2 ID of UE-B. This parameter can be optional. | 8 bits (or 16-bits) |
| Destination Layer-1 ID | Least significant 16-bits of destination ID of UE-A. | 16 bits |
| Zone ID | Zone ID of UE-B. Can be an optional parameter. | 12 bits |
| Communication Range | Can be an optional parameter | 4 bits |
| Resource Type | Indicates preferred or non-preferred resources. This parameter can be optional. | 1 bit |
| Resource size | The resource size in number of sub-channels. The maximum number of sub-channels is 27. This parameter can be optional. | Up to 5 bits |
| Resource Combination | N combinations of TRIV, FRIV and resource reservation period. For example, N can be up to 3. | |
| First resource location | N first resource location. Each First resource location is 5 bits. For example, N can be up to 3. | Up to 15 bits |

TABLE 6-continued

| Example of content of second stage SCI for RSAI message | | |
|---|---|---|
| Parameter | Description | Size in bits |
| Padding | If needed. This is to align the size of the second stage SCI for RSAI request with the second stage SCI for RSAI. The smaller of the two is padded to have size equal to the larger of the two | Variable |

TABLE 7

| Example of content of second stage SCI for RSAI message | | |
|---|---|---|
| Parameter | Description | Size in bits |
| Identifier for SCI format | Determines whether the second stage SCI is for RSAI (IUC) or RSAI (IUC) request. For example, “0” for RSAI (IUC) message and “1” for RSAI (IUC) request | 1 bit |
| Source Layer-1 ID | Least significant 8-bits (or 16-bits) of source Layer-2 ID of UE-B. This parameter can be optional. | 8 bits (or 16-bits) |
| Destination Layer-1 ID | Least significant 16-bits of destination ID of UE-A. | 16 bits |
| Zone ID | Zone ID of UE-B. Can be an optional parameter. | 12 bits |
| Communication Range | Can be an optional parameter | 4 bits |
| Resource Type | Indicates preferred or non-preferred resources. This parameter can be optional. | 1 bit |
| Resource size | The resource size in number of sub-channels. The maximum number of sub-channels is 27. This parameter can be optional. | Up to 5 bits |
| Resource Combination | N combinations of TRIV. FRIV and resource reservation period. For example, N can be up to 3. | |
| Reference Location | Location of a reference time. This can be a combination of DFN index and slot index. Alternatively, this can be the logical slot number within a resource pool. | Up to 17 bits |
| Slot offset | N or N − 1 slot offset. Each slot offset is Y bits. For example, N can be up to 3. In another example N is 2. | N × [Y] bits. Y can be between 8 and 13 |
| Padding | If needed. This is to align the size of the second stage SCI for RSAI request with the second stage SCI for RSAI. The smaller of the two is padded to have size equal to the larger of the two | Variable |

In one example, for TABLE 6 and TABLE 7, the source layer-1 ID can be not included in the RSAI message, for example this can be for the case of explicit request-based RSAI, when the RSAI message from a UE-A is transmitted in response to a RSAI request from a UE-B, and when the transmission from the UE-B is a unicast transmission (e.g., the UE-B sends the RSAI request to one UE-A). In this case the source layer-1 ID can be absent, the UE-B upon receiving the RSAI message can determine from the destination layer-1 ID if the message is intended for the UE-B, and the UE-B may know the source layer-1 ID of that UE. In another example, the source layer-1 ID is included in the RSAI message, for example this can be for the case of condition-based RSAI or explicit request-based RSAI, when the RSAI request is sent to more than one UE-A (e.g., for groupcast transmission from the UE-B). In this case the source ID can help the UE-B identify the source of the RSAI message.

When the source layer-1 ID is included in the RSAI message, in one example the source layer-1 ID is the 8 least significant bits of the source layer-2 ID. In another example, the source layer-1 ID is the 16 least significant bits of the source layer-2 ID.

In one example, for TABLE 6 and TABLE 7, the “Resource Type” can be not included in the RSAI message, for example this can be for the case of explicit request-based RSAI, when the RSAI request includes the “Resource Type” and the RSAI message is in response to the RSAI request. In another example, the “Resource Type” is included in the RSAI message, for example this can be for the case of condition-based RSAI or explicit request-based RSAI and the RSAI request does not include “Resource Type” (for example, a UE-A can determine the resource type (preferred or non-preferred) based on the resource type that requires a smaller message).

In one example, for TABLE 6 and TABLE 7, the “Resource Size” can be not included in the RSAI message, for example this can be for the case of explicit request-based RSAI, when the RSAI request includes the “Resource Size” and the RSAI message is in response to the RSAI request. In another example, the “Resource Size” is included in the RSAI message, for example this can be for the case of condition-based RSAI, and the “Resource Size” is specified in the system specification (for example a “Resource Size” of 1), or is (pre-)configured for a resource pool, in one example a default “Resource Size” (for example a default “Resource Size” of 1) is assumed if the “Resource Size” is not (pre-)configured.

In another example, the “Resource Size” is included in the RSAI message, for example this can be for the case of condition-based RSAI or explicit request-based RSAI and the RSAI request does not include "Resource Type," in this case the UE (UE-A) determines the resource size based on: (1) (pre-)configured value or values of the "Resource Size." In one example a default "Resource Size" (for example a default "Resource Size" of 1) is assumed if the "Resource Size" is not (pre-)configured; and (2) by the UE's implementation, wherein the "Resource Size," is one of allowed number of sub-channels (pre-) configured for a resource pool.

In TABLE 6 and TABLE 7, "Resource Combination" can include for each combination (referred to as TRIV combination of slots) of the N combinations.

In one embodiment, each combination can include the Time Resource in Value (TRIV), Frequency Resource in Value (FRIV) and resource reservation period as specified in Rel-16 (TS 38.212 and TS 38.214). The TRIV and FRIV can signal two or three resources.

In one embodiment, the TRIV can be 5 bits if the combination is signaling 2 resources or 9 bits if the combination is signaling 3 resources, as described in TS 38.212. In one example, the number of resources in each combination (2 or 3) can be specified in the system specification. In another example, the number of resources in each combination (2 or 3) can be (pre-) configured for resource pool with a default value if not (pre-)configured.

In one embodiment, the FRIV can have a size that depends on the number of sub-channels $$\left(N_{subChannel}^{SL}\right)$$

in the resource pool. In such embodiment, (1) if the combination is signaling 2 resources:

$$\log_2\left(\frac{N_{subChannel}^{SL}\left(N_{subChannel}^{SL}+1\right)}{2}\right)\text{ bits,}$$

and (2) if the combination is signaling 3 resources:

$$\log_2\left(\frac{N_{subChannel}^{SL}\left(N_{subChannel}^{SL}+1\right)\left(N_{subChannel}^{SL}+1\right)}{6}\right)\text{ bits.}$$

Regarding, resource reservation period, in one example, the resource reservation period field can be not included in the RSAI message, for the case of explicit request-based RSAI, when the RSAI request includes the "Resource reservation period" and the RSAI message is in response to the RSAI request. In another example, the size of the "Resource Reservation Period" is given by: $\lceil \log_2 N_{rsv\_period} \rceil$ bits where $N_{rsv\_period}$ is the number of entries in the higher layer parameter sl-ResourceReservePeriodList, if higher layer parameter sl-MultiReserveResource is configured, 0 bit otherwise.

In one example, assume that three resources are included in each resource combination and: (1) for preferred resources, the resource commination includes only FRIV and TRIV. The bit width of the resource combination is $$N\times\left(\left\lceil\log_2\left(\frac{N_{subChannel}^{SL}\left(N_{subChannel}^{SL}+1\right)\left(2N_{subChannel}^{SL}+1\right)}{6}\right)\right\rceil+9\right),$$

where N is for example 3. The maximum size, with $$N_{subChannel}^{SL}=27,$$

is 66 bits (N=3); and (2) for non-preferred resources, the resource commination includes FRIV, the TRIV and resource reservation period. The bit width of the resource combination is $$N\times\left(\left\lceil\log_2\left(\frac{N_{subChannel}^{SL}\left(N_{subChannel}^{SL}+1\right)\left(2N_{subChannel}^{SL}+1\right)}{6}\right)\right\rceil+9+\lceil\log_2 N_{rsv\_period}\rceil\right),$$

where N is for example 2 or 3. The maximum size, with $$N_{subChannel}^{SL}=27$$

and $N_{rsv\_period}=16$, is 52 bits (N=2) or 78 bits (N=3).

In TABLE 6, "First resource location" is the location of the first resource for each of the N combinations.

In one example, the location of the first resource is in logical slots relative to the slot in which the RSAI message is transmitted.

In another example, the location of first resource is in logical slots relative to the slot in which the RSAI message is transmitted, plus an offset. Wherein, the offset is specified in the system specifications (for example, the offset is 0 or the offset is N physical slots, or the offset is N logical slots, wherein N can depend on the sub-carrier spacing). Alternatively, the offset is (pre-) configured for a resource pool, if not (pre-)configured a default value is used (for example, the default offset is 0 or the default offset is N physical slots or the default offset is N logical slots, wherein N can depend on the sub-carrier spacing). In one example the additional offset is in physical slots or physical time. In another example, the default offset is in logical slots.

In one example, the location (e.g., slot) of the first resource of the first TRIV combination of slots is a logical slot number within the resource pool (e.g., number of logical slots between the first logical slot at or after slot #0 of DFN #0 or SFN #0 and the logical slot of the first resource of the TRIV combination of slots). The location of the first resource of any other TRIV combination of slots (i.e., except the first TRIV) is an offset in logical slots to the first resource of the previous TRIV combination of slots.

In one example, the location (e.g., slot) of the first resource of the first TRIV combination of slots is a logical slot number within the resource pool (e.g., number of logical slots between the first logical slot at or after slot #0 of DFN #0 or SFN #0 and the logical slot of the first resource of the TRIV combination of slots). The location of the first resource of any other TRIV combination of slots (i.e., except the first TRIV) is an offset in logical slots to the slot of the last resource of the previous TRIV combination of slots.

In one example, the location (e.g., slot) of the first resource of the first TRIV combination of slots is a logical slot number within the resource pool (e.g., number of logical slots between the first logical slot at or after slot #0 of DFN #0 or SFN #0 and the logical slot of the first resource of the TRIV combination of slots). The location of the first resource of any other TRIV combination of slots (i.e., except the first TRIV) is an offset in logical slots to the first resource of the first TRIV combination of slots.

In one example, the location (e.g., slot) of the first resource of any TRIV combination of slots is a logical slot number within the resource pool (e.g., number of logical slots between the first logical slot at or after slot #0 of DFN #0 or SFN #0 and the logical slot of the first resource of the TRIV combination of slots).

In one example, the location (e.g., slot) of the first resource of the first TRIV combination of slots is given by a combination of a frame offset from DFN 0 (e.g., DFN index) or SFN 0 (e.g., SFN index) and a slot offset (e.g., slot index) within the frame given by the frame offset, or a number of physical slots from slot 0 of DFN 0 or SFN 0. The location of the first resource of any other TRIV combination of slots (i.e., except the first TRIV) is an offset in logical slots to the first resource of the previous TRIV combination of slots.

In one example, the location (e.g., slot) of the first resource of the first TRIV combination of slots is given by a combination of a frame offset from DFN 0 (e.g., DFN index) or SFN 0 (e.g., SFN index) and a slot offset (e.g., slot index) within the frame given by the frame offset, or a number of physical slots from slot 0 of DFN 0 or SFN 0. The location of the first resource of any other TRIV combination of slots (i.e., except the first TRIV) is an offset in logical slots to the slot of the last resource of the previous TRIV combination of slots.

In one example, the location of the first resource of the first TRIV combination of slots is given by a combination of a frame offset from DFN 0 (e.g., DFN index) or SFN 0 (e.g., SFN index) and a slot offset (e.g., slot index) within the frame given by the frame offset, or a number of physical slots from slot 0 of DFN 0 or SFN 0. The location of the first resource of any other TRIV combination of slots (i.e., except the first TRIV) is an offset in logical slots to the first resource of the first TRIV combination of slots.

In one example, the location of the first resource of any TRIV combination of slots is given by a combination of a frame offset from DFN 0 (e.g., DFN index) or SFN 0 (e.g., SFN index) and a slot offset (e.g., slot index) within the frame given by the frame offset or a number of physical slots from slot 0 of DFN 0 or SFN 0.

As a variant of the previous examples, the reference slot (e.g., slot 0 of DFN 0 or SFN 0 in the previous examples) can be specified in the system specifications and/or pre-configured and/or configured by higher layers.

As a variant of the previous examples, there can be N reference slots that can be specified in the system specifications and/or pre-configured and/or configured by higher layers.

In one example, if there are N reference slots and $T'_{max}$ logical slots in a resource pool, the reference slots can be:

$$S+0,\ S+\left\lfloor\frac{T'_{max}}{N}\right\rfloor,\ S+\left\lfloor\frac{2T'_{max}}{N}\right\rfloor,\ \ldots\ ,\ S+\left\lfloor\frac{(N-1)T'_{max}}{N}\right\rfloor.$$

Alternatively, the reference slots are $$S+0,\ S+\left\lfloor\frac{T'_{max}}{N}\right\rfloor,\ S+\left\lfloor\frac{2T'_{max}}{N}\right\rfloor,\ \ldots\ ,\ S+\left\lfloor\frac{(N-1)T'_{max}}{N}\right\rfloor.$$

One example S=0, in another example S can be specified in the system specifications and/or pre-configured and/or configured by higher layers.

In one example, a first reference slot and an offset (e.g., in logical slots) between consecutive reference slots can be specified in the system specifications and/or pre-configured and/or configured by higher layers.

In one example, if there are N reference slots and $10240\times 2^{\mu}$, μ is the sub-carrier spacing configuration, logical slots in 10240 ms period starting from slot 0 of SFN 0 or DFN 0, the reference slots can be:

$$S+0,\ S+\left\lfloor\frac{10240\times 2^{\mu}}{N}\right\rfloor,\ S+\left\lfloor\frac{2\times 10240\times 2^{\mu}}{N}\right\rfloor,\ \ldots\ ,\ S+\left\lfloor\frac{(N-1)\times 10240\times 2^{\mu}}{N}\right\rfloor.$$

Alternatively, the reference slots are $$S+0,\ S+\left\lceil\frac{10240\times 2^{\mu}}{N}\right\rceil,\ S+\left\lceil\frac{2\times 10240\times 2^{\mu}}{N}\right\rceil,\ \ldots\ ,\ S+\left\lceil\frac{(N-1)\times 10240\times 2^{\mu}}{N}\right\rceil.$$

One example S=0, in another example S can be specified in the system specifications and/or pre-configured and/or configured by higher layers. The reference logical slot can be the first logical slots after (or before) the aforementioned reference slots.

In one example, a first reference slot and an offset (e.g., in physical slots) between consecutive reference slots can be specified in the system specifications and/or pre-configured and/or configured by higher layers. The reference logical slot can be the first logical slots after (or before) the aforementioned reference slots.

The reference location in TABLE 7 can be indicated by a combination of a DFN index and slot index. The DFN index can be from 0 to 1023, and requires 10 bits. The slot index can be 0 to $10\times 2^{\mu}-1$, where μ is the sub-carrier spacing (SCS) configuration that can be {0, 1, 2, 3} for SCS∈{15, 30, 60, 120} kHz respectively. Therefore, the total bit-width of the reference location can be up to 14+μ bits. If a coarser granularity is used, the bit-width can be smaller. Alternatively, the reference location can be the logical slot index within the resource pool. This can reduce the bit width of the reference location field.

The bit-width of the slot offset from the reference slot depends on (1) the maximum duration to be signal, (2) the granularity of the duration of the first location. If the reference location is the location of the first resource of the first TRIV, signaling of location of the first resource for the first TRIV is avoided. Therefore, in this case, there is N−1 "slot offsets" for the first resource of each TRIV other than the first TRIV. The slot offset of the first resource of the first TRIV can be assumed to be 0 by design. Alternatively, if the slot offset of the first resource of the first TRIV can't be assumed to be 0 then N slot offset values are needed.

If it may be assumed that Y=8 bits are allocated to slot offset between the reference location and the first resource of each TRIV, the granularity can be provided and allowed for a large slot offset. Example of (pre-) configured granularities are illustrated in TABLE 8 and TABLE 9. A subset of the values of TABLE 8 and TABLE 9 can be allowed for (pre-)configuration. If not (pre-)configured a default slot granularity can be used (e.g., slot granularity of 1 slot).

TABLE 8

Example of pre-configured granularities starting from offset 0

| (Pre-)Configured Granularity (slots) | Maximum slot offset | Maximum duration in ms 15 kHz | 30 kHz | 60 kHz | 120 kHz |
|---|---|---|---|---|---|
| 1 | 255 | 255 ms | 127.5 ms | 63.75 ms | 31.875 ms |
| 2 | 510 | 510 ms | 255 ms | 127.5 ms | 63.75 ms |
| 4 | 1020 | 1020 ms | 510 ms | 255 ms | 127.5 ms |
| 5 | 1275 | 1275 ms | 637.5 ms | 318.75 ms | 159.375 ms |
| 8 | 2040 | 2040 ms | 1020 ms | 510 ms | 255 ms |
| 10 | 2550 | 2550 ms | 1275 ms | 637.5 ms | 318.75 ms |
| 16 | 4090 | 4090 ms | 2040 ms | 1020 ms | 510 ms |
| 20 | 5100 | 5100 ms | 2550 ms | 1275 ms | 637.5 ms |
| 32 | 8180 | 8180 ms | 4090 ms | 2040 ms | 1020 ms |

TABLE 9

Example of pre-configured granularities starting from offset 1

| (Pre-)Configured Granularity (slots) | Maximum slot offset | Maximum duration in ms 15 kHz | 30 kHz | 60 kHz | 120 kHz |
|---|---|---|---|---|---|
| 1 | 256 | 256 ms | 128 ms | 64 ms | 32 ms |
| 2 | 512 | 512 ms | 256 ms | 128 ms | 64 ms |
| 4 | 1024 | 1024 ms | 512 ms | 256 ms | 128 ms |
| 5 | 1280 | 1280 ms | 640 ms | 320 ms | 160 ms |
| 8 | 2048 | 2048 ms | 1024 ms | 512 ms | 256 ms |
| 10 | 2560 | 2560 ms | 1280 ms | 640 ms | 320 ms |
| 16 | 4096 | 4096 ms | 2048 ms | 1024 ms | 512 ms |
| 20 | 5120 | 5120 ms | 2560 ms | 1280 ms | 640 ms |
| 32 | 8192 | 8192 ms | 4096 ms | 2048 ms | 1024 ms |

If the value of Y changes, the values in Table 5 change accordingly.

As an example, for the structure of the RSAI message, 2 cases (N is the number of resource combinations) in SCI format 2-C are provided: (1) Case 1: N=3 for preferred resources with zone ID and N=3 for non-preferred resource without zone ID as illustrated in TABLE 10; and (2) Case 2: N=3 for preferred resources with zone ID and N=2 for non-preferred resource with zone ID as illustrated in TABLE 11.

TABLE 10

RSAI Message structure with maximum size of each field with N = 3 for (1) preferred resource set, (2) non-preferred resource set

| Field | Size (Preferred resources) | Size (Non-preferred resources) |
|---|---|---|
| Source ID | 8 | 8 |
| Destination ID | 16 | 16 |
| RSAI Message/Request Indicator | 1 | 1 |
| Zone ID | 12 | N/A |
| Cast Type | N/A (used for BC/GC only) | 2 |
| Resource Type | 1 | 1 |
| Resource combination | up to 66 | up to 78 |
| Reference Location | Up to 17 | Up to 17 |
| First Locations of TRIV | 2 × 8 | 2 × 8 |
| Padding | 2 | 0 |
| Total | 139 | 139 |

TABLE 11

RSAI Message structure with maximum size of each field for (1) preferred resource set (N = 3), (2) non-preferred resource set (N = 2).

| Field | Size (Preferred resources) | Size (Non-preferred resources) |
|---|---|---|
| Source ID | 8 | 8 |
| Destination ID | 16 | 16 |
| RSAI Message/Request Indicator | 1 | 1 |
| Zone ID | 12 | 12 |
| Cast Type | N/A (used for BC/GC only) | 2 |
| Resource Type | 1 | 1 |
| Resource combination | Up to 66 | Up to 52 |
| Reference Location | Up to 17 | Up to 17 |
| First Locations of TRIV | 2 × 8 | 1 × 8 |
| Padding | 0 | Up to 20 |
| Total | 137 | 137 |

The payload of the second stage SCI (e.g., SCI format 2-C) passes through channel coding stages are described in TS 38.212: (1) first a CRC is attached to the payload as described in TS 38.212; (2) next channel coding is performed as described in TS 38.212; and (3) next rate matching is performed. The details of rate matching are described later in this disclosure.

In one example, the inter-UE co-ordination message (RSAI message) is sent in a second stage SCI format without a SL-shared channel (SL-SCH). i.e., the PSSCH only includes the second stage SCI format.

As the PSSCH only includes the second stage SCI (there is no SL-SCH). The output of rate matching as described above may fill the resource elements of PSSCH. The resource element of PSSCH available for second stage SCI transmission are given by: $RE^{PSSCH}=$ $$\sum_{l=0}^{N_{symbol}^{PSSCH}-1} M_{sc}^{SCI2}(l)$$

where: (1)

$$N_{symbol}^{PSSCH}$$

is the number of symbols allocated to PSSCH; an (2)

$$M_{sc}^{SCI2}(l)$$

is the number of resource elements that can be used for transmission of the second stage SCI in PSSCH symbol l. The resource elements used for the second stage SCI exclude resource elements used for PSSCH DM-RS, PT-RS and PSCCH (including PSCCH information resource elements and PSCCH DM-RS resource elements).

For second stage SCI, QPSK modulation is used. The UE is not expected to have more than 4096 coded-bits after rate matching. With QPSK modulation, this may correspond to 2048 coded modulation symbols. If the number of available PSSCH REs for second stage SCI, as given by $RE^{PSSCH}$, is greater than 2048 REs, fewer PSSCH symbols are used for the transmission of the second stage SCI such that number of available REs is less than 2048 REs. The number of PSSCH symbols used the second stage SCI, X, is determined such that if $$RE^{PSSCH} \leq 2048,\ X = N_{symbol}^{PSSCH},$$

else X is the largest integer such that $$\sum_{l=0}^{N_{symbol}^{PSSCH}-1} M_{sc}^{SCI2}(l) \leq 2048 \text{ and } X \geq 1.$$

Rate matching is performed as described in TS 38.212, except that $$Q'_{SCI2} = \sum_{l=0}^{X-1} M_{sc}^{SCI2}(l).$$

The symbols between X and $$N_{symbol}^{PSSCH} - 1$$

are not used for transmission (i.e., no transmission for PSSCH in these symbols). Only the first X PSSCH symbols are used for the transmission of the second stage SCI.

The output of rate matching is scrambled as described in TS 38.211.

The output of scrambling is modulated using QPSK modulation as described in TS 38.211.

A single layer is used for the second stage SCI. Layer mapping of the modulated symbols is as described in TS 38.211.

Precoding of the output of layer mapping is as described in TS 38.211.

For each of the antenna ports used for the transmission of the PSSCH, the block of complex-valued symbols $$z^{(p)}(0), \ldots, z^{(p)}\left(M_{symb}^{ap} - 1\right)$$

may be multiplied with the amplitude scaling factor $$\beta_{DMRS}^{PSSCH}$$

in order to conform to the transmit power as specified in TS 38.213 and mapped to resource elements $(k', l)_{p,\mu}$ in the virtual resource blocks assigned for transmission, where k'=0 is the first sub-carrier in the lowest-numbered virtual resource block assigned for transmission.

The following examples illustrate how to map the pre-coded symbols of each antenna ports to the available resource elements for the second stage SCI.

In one example, the complex-valued symbols corresponding to the second stage SCI are mapped in increasing order of first the index k' over the assigned virtual resource blocks and then the index l, starting from the first PSSCH symbol carrying an associated DM-RS. After mapping to the resource elements of symbol X−1, the index l wraps around to l=0 and continues with the mapping the complexed-valued symbols. The resource elements used for the second stage SCI in the PSSCH symbols exclude resource elements used for PSSCH DM-RS, PT-RS and PSCCH (including PSCCH information resource elements and PSCCH DM-RS resource elements). This is illustrated in FIG. 10.

In another example, the complex-valued symbols corresponding to the second stage SCI are mapped in increasing order of first the index k' over the assigned virtual resource blocks and then the index l, starting from the first PSSCH symbol with index l=0, this continues until the last PSSCH symbol X−1. The resource elements used for the second stage SCI in the PSSCH symbols exclude resource elements used for PSSCH DM-RS, PT-RS and PSCCH (including PSCCH information resource elements and PSCCH DM-RS resource elements). This is illustrated in FIG. 11.

In another example, the inter-UE co-ordination message (RSAI message) is sent in a second stage SCI format without a SL-shared channel (SL-SCH). i.e., the PSSCH only includes the second stage SCI format. The UE determines the target code rate R as described in TS 38.214 using the modulation and coding field included in the first stage SCI. The UE determines the number of coded bits, $Q'_{SCI2}$, for the second stage SCI carrying the RSAI message as described in TS 38.212.

In one example, the parameter γ is selected as described in TS 38.212.

In another example, the parameter γ is selected as the number of vacant resource elements in the last symbol of the second stage SCI.

In another example, if the last symbol of the second stage SCI is not a DMRS symbol, and there is at least one vacant symbol in the PSSCH, a DMRS symbol is appended to the last symbol of the second stage SCI, the parameter $\gamma$ is selected as the number of vacant resource elements in the last symbol of the send stage SCI and the appended DMRS symbol.

Rate matching is performed as described in TS 38.212.

The output of rate matching is scrambled as described in TS 38.211.

The output of scrambling is modulated using QPSK modulation as described in TS 38.211.

A single layer is used for the second stage SCI. Layer mapping of the modulated symbols is as described in TS 38.211.

Precoding of the output of layer mapping is as described in TS 38.211.

For each of the antenna ports used for the transmission of the PSSCH, the block of complex-valued symbols $$z^{(p)}(0), \ldots, z^{(p)}(M_{symb}^{ap}-1)$$

may be multiplied with the amplitude scaling factor $$\beta_{DMRS}^{PSSCH}$$

in order to conform to the transmit power as specified in TS 38.213 and mapped to resource elements $(k', l)_{p,\mu}$ in the virtual resource blocks assigned for transmission, where k'=0 is the first sub-carrier in the lowest-numbered virtual resource block assigned for transmission.

The following examples illustrate how to map the pre-coded symbols of each antenna ports to the available resource elements for the second stage SCI.

In one example, the complex-valued symbols corresponding to the second stage SCI are mapped in increasing order of first the index k' over the assigned virtual resource blocks and then the index l, starting from the first PSSCH symbol carrying an associated DM-RS, this continues until all the second stage SCI REs are mapped to resource elements. The resource elements used for the second stage SCI in the PSSCH symbols exclude resource elements used for PSSCH DM-RS, PT-RS and PSCCH (including PSCCH information resource elements and PSCCH DM-RS resource elements). This is illustrated in Example 1 of FIG. 12.

In another example, the complex-valued symbols corresponding to the second stage SCI are mapped in increasing order of first the index k' over the assigned virtual resource blocks and then the index l, starting from the first PSSCH symbol with index l=0, this continues until all the second stage SCI REs are mapped to resource elements. The resource elements used for the second stage SCI in the PSSCH symbols exclude resource elements used for PSSCH DM-RS, PT-RS and PSCCH (including PSCCH information resource elements and PSCCH DM-RS resource elements). This is illustrated in Example 2 of FIG. 12.

In one example, in a symbol with REs occupied, the energy per resource element is $EPRE_{all}$. In a symbol with V vacant resource elements and O occupied resource elements, the EPRE of the occupied resource elements ($EPRE_0$) is boasted by $$\frac{O+V}{O}, \text{ i.e., } EPRE_O = \frac{O+V}{O} EPRE_{all},$$

or in dBm $$EPRE_O(\text{dBm}) = 10\log_{10}\frac{O+V}{O} + EPRE_{all}(\text{dBm}).$$

In a symbol with all resource elements vacant there is no transmission.

In another example, in a symbol with vacant REs, the ERRE of the occupied REs is not boasted.

In another example, if a DMRS symbol has a gap before it, an AGC symbol is included. The AGC symbol is the repetition of the DMRS symbol before the DMRS symbol. This is illustrated in Example 4 of FIG. 12.

In another example, if a DMRS symbol has a gap before it, there is no repetition of the DMRS symbol. The DMRS is transmitted without repetition. This is illustrated in Example 3 of FIG. 12.

In another example, the inter-UE co-ordination message (RSAI message) is sent in a second stage SCI format with a SL-shared channel (SL-SCH). i.e., the PSSCH includes a second stage SCI format and a SL-SCH. The SL-SCH only includes MAC CE that includes the RSAI message. The rate matching for the second stage SCI is performed as described in TS 38.212. The second stage SCI and the SL-SCH are multiplexed as described in TS 38.212. The scrambling, modulation, layer mapping, precoding and mapping to resource elements are as described in TS 38.211.

In one example, only QPSK is used to modulate the symbols corresponding to the SL-SCH. In another example, other modulation schemes such 16QAM, 64QAM and 256QAM can modulate the symbols corresponding to SL-SCH in addition to QPSK. In one example, only one layer can be used for RSAI message, in another example, one or two layers can be used RSAI message.

In one example, HARQ re-transmissions are disabled for the SL-SCH channel carrying the RSAI message. Each transmission of the RSAI message is independent of the previous transmissions.

In another example, HARQ re-transmissions are enabled for the SL-SCH channel carrying the RSAI message. A transmission of the RSAI message can be a re-transmission of the previous RSAI message.

In one example, the new data indicator field is included in the second stage SCI (e.g., SCI format 2C), this field is toggled for each new RSAI message transmission in the SL-SCH.

In one example, the "redundancy version" (RV) field is included in the second stage SCI (e.g., SCI format 2C).

In another example, the "redundancy version" (RV) field is not included in the second stage SCI (e.g., SCI format 2C). A fixed RV is used (e.g., RV 0).

In one example, when there is a re-transmission of the RSAI message, the RSIA message in the second stage SCI (e.g., SCI format 2C) is not updated, i.e., the same RSAI message is re-transmitted in both the second stage SCI (e.g., SCI format 2C) and the corresponding SL-SCH the same as the previous one.

In another example, when there is a re-transmission of the RSAI message, the RSIA message in the second stage SCI (e.g., SCI format 2C) can be updated, i.e., the same RSAI message is re-transmitted in SL-SCH, but the corresponding second stage SCI (e.g., SCI format 2C) in the re-transmitted RSAI message can be updated.

In another example, the inter-UE co-ordination message (RSAI message) is sent in a second stage SCI format with a SL-shared channel (SL-SCH). i.e., the PSSCH includes a second stage SCI format and a SL-SCH. The SL-SCH includes dummy data (i.e., data carries no useful information just for purpose of including a SL-SCH with the second stage SCI). The rate matching for the second stage SCI is performed as described in TS 38.212. The second stage SCI and the SL-SCH are multiplexed as described in TS 38.212. The scrambling, modulation, layer mapping, precoding and mapping to resource elements are as described in TS 38.211.

In one example, only QPSK is used to modulate the symbols corresponding to the SL-SCH. In another example, other modulation schemes such 16QAM, 64QAM and 256QAM can modulate the symbols corresponding to SL-SCH in addition to QPSK. In one example, only one layer can be used for RSAI message, in another example, one or two layers can be used RSAI message.

In one example, HARQ re-transmissions are disabled for the SL-SCH channel carrying dummy data. Each transmission of the dummy data is independent of the previous transmissions.

In another example, HARQ re-transmissions are enabled for the SL-SCH channel carrying dummy data.

In one example, the new data indicator field is included in the second stage SCI (e.g., SCI format 2C).

In one example, the “redundancy version” (RV) field is included in the second stage SCI (e.g., SCI format 2C).

In another example, the “redundancy version” (RV) field is not included in the second stage SCI (e.g., SCI format 2C). A fixed RV is used (e.g., RV 0).

In another example, the inter-UE co-ordination message (RSAI message) is sent in a second stage SCI format with a SL-shared channel (SL-SCH). i.e., the PSSCH includes a second stage SCI format and a SL-SCH. The SL-SCH includes MAC CE that includes the RSAI message as well as other SL data. The rate matching for the second stage SCI is performed as described in TS 38.212. The second stage SCI and the SL-SCH are multiplexed as described in TS 38.212. The scrambling, modulation, layer mapping, precoding and mapping to resource elements are as described in TS 38.211.

In one example, only QPSK is used to modulate the symbols corresponding to the SL-SCH. In another example, other modulation schemes such 16QAM, 64QAM and 256QAM can modulate the symbols corresponding to SL-SCH in addition to QPSK. In one example, only one layer can be used for RSAI message, in another example, one or two layers can be used RSAI message.

In one example, HARQ re-transmissions are disabled for the SL-SCH channel carrying the RSAI message and other SL data. Each transmission of the RSAI message and SL data is independent of the previous transmissions.

In another example, HARQ re-transmissions are enabled for the SL-SCH channel carrying the RSAI message and other SL data. A transmission of the RSAI message and other SL data can be a re-transmission of the previous RSAI message and other SL data.

In one example, the new data indicator field is included in the second stage SCI (e.g., SCI format 2C), this field is toggled for each new RSAI message and SL data transmission in the SL-SCH.

In one example, the “redundancy version” (RV) field is included in the second stage SCI (e.g., SCI format 2C).

In another example, the “redundancy version” (RV) field is not included in the second stage SCI (e.g., SCI format 2C). A fixed RV is used (e.g., RV 0).

In one example, when there is a re-transmission of the RSAI message, the RSIA message in the second stage SCI (e.g., SCI format 2C) is not updated, i.e., the same RSAI message is re-transmitted in both the second stage SCI (e.g., SCI format 2C) and the corresponding SL-SCH the same as the previous one.

In another example, when there is a re-transmission of the RSAI message, the RSIA message in the second stage SCI (e.g., SCI format 2C) can be updated, i.e., the same RSAI message is re-transmitted in SL-SCH, but the corresponding second stage SCI (e.g., SCI format 2C) in the re-transmitted RSAI message can be updated.

In another example, the inter-UE co-ordination message (RSAI message) is sent in a second stage SCI format with a SL-shared channel (SL-SCH). i.e., the PSSCH includes a second stage SCI format and a SL-SCH. The SL-SCH includes SL data. The rate matching for the second stage SCI is performed as described in TS 38.212. The second stage SCI and the SL-SCH are multiplexed as described in TS 38.212. The scrambling, modulation, layer mapping, precoding and mapping to resource elements are as described in TS 38.211.

In one example, the RSAI (IUC) message from a first UE (e.g., UE-A) to one or more second UEs (e.g., UE-B(s)) can include a flag to indicate whether the RSAI (IUC) information in the message may be incrementally added (e.g., by taking union) to previously transmitted RSAI (IUC) information from the first UE or the RSAI (IUC) information may be considered as new RSAI (IUC) information and any previous RSAI (IUC) information the second UE received from the first UE is discarded.

In one example, the RSAI (IUC) message for preferred resource set from a first UE (e.g., UE-A) to one or more second UEs (e.g., UE-B(s)) includes a flag to indicate whether the RSAI (IUC) information for preferred resource set in the message may be incrementally added (e.g., by taking union) to previously transmitted RSAI (IUC) information for preferred resource set from the first UE or the RSAI (IUC) information may be considered as new RSAI (IUC) information for preferred resource set and any previous RSAI (IUC) information for preferred resource set the second UE received from the first UE is discarded.

In one example, the RSAI (IUC) message for non-preferred resource set from a first UE (e.g., UE-A) to one or more second UEs (e.g., UE-B(s)) includes a flag to indicate whether the RSAI (IUC) information for non-preferred resource set in the message may be incrementally added (e.g., by taking union) to previously transmitted RSAI (IUC) information from the first UE for non-preferred resource set or the RSAI (IUC) information may be considered as new RSAI (IUC) information for non-preferred resource set and any previous RSAI (IUC) information for non-preferred resource set the second UE received from the first UE is discarded.

In one example, the RSAI (IUC) message for preferred resource set and non-preferred resource set from a first UE (e.g., UE-A) to one or more second UEs (e.g., UE-B(s)) includes a flag to indicate whether the RSAI (IUC) information for preferred resource set and non-preferred resource set in the message may be incrementally added (e.g., by taking union) to previously transmitted RSAI (IUC) information from the first UE for preferred resource set and non-preferred resource set or the RSAI (IUC) information may be considered as new RSAI (IUC) information for preferred resource set and non-preferred resource set and any previous RSAI (IUC) information for preferred resource set and non-preferred resource set the second UE received from the first UE is discarded.

In one example, if the flag is “1” the RSAI (IUC) message from a first UE (e.g., UE-A) to one or more second UEs (e.g., UE-B(s)) is incrementally added (e.g., by taking union) to previously transmitted RSAI (IUC) information from the first UE to the second UE. If the flag is “0,” the RSAI (IUC) message may be considered as new RSAI (IUC) information and any previous RSAI (IUC) information the second UE received from the first UE is discarded.

In one example, if the flag is “0” the RSAI (IUC) message from a first UE (e.g., UE-A) to one or more second UEs (e.g., UE-B(s)) is incrementally added (e.g., by taking union) to previously transmitted RSAI (IUC) information from the first UE to the second UE. If the flag is “1,” the RSAI (IUC) message may be considered as new RSAI (IUC) information and any previous RSAI (IUC) information the second UE received from the first UE is discarded.

In one example, if the flag the RSAI (IUC) message from a first UE (e.g., UE-A) to one or more second UEs (e.g., UE-B(s)) is the same as that of the previous RSAI (IUC) message from a first UE to the one or more second UEs, the RSAI (IUC) message is incrementally added (e.g., by taking union) to the previously transmitted RSAI (IUC) information from the first UE to the second UE. If the flag is toggled from that of the previous RSAI (IUC) message, the RSAI (IUC) message may be considered as new RSAI (IUC) information and any previous RSAI (IUC) information the second UE received from the first UE is discarded.

In one example, if the flag the RSAI (IUC) message from a first UE (e.g., UE-A) to one or more second UEs (e.g., UE-B(s)) is toggled from that of the previous RSAI (IUC) message from a first UE to the one or more second UEs, the RSAI (IUC) message is incrementally added (e.g., by taking union) to the previously transmitted RSAI (IUC) information from the first UE to the second UE. If the flag is the same as that of the previous RSAI (IUC) message, the RSAI (IUC) message may be considered as new RSAI (IUC) information and any previous RSAI (IUC) information the second UE received from the first UE is discarded.

For condition-based triggering there could be multiple conditions to consider as a causing for triggering: (1) triggering based on higher layer configuration, for example this can be for a special type of UE such as high energy UE that are connected to a power supply; (2) triggering when the CBR exceeds a certain power level. Wherein the CBR threshold can be (pre-)configured for a resource pool or (pre-)configured for a UE; and (3) triggering when the HARQ error rate exceeds a certain level. Wherein the HARQ error rate can be (pre-)configured for a resource pool or (pre-)configured for a UE. In one example, the HARQ error rate can depend on the priority of the SL transmission.

Once a UE-A is triggered to transmit RSAI based on a condition, the UE-A may decide which UE-B(s) this data could be sent to.

In one example, the RSAI message can be unicast to one UE-B. For example, if the UE-A is receiving data from the UE-A and the HARQ error rate exceeds a threshold (that can depend on the priority of the SL transmission) or the CBR level exceeds a threshold, the UE-A can unicast the RSAI message to that user.

In another example, the RSAI message can be groupcast to set of UE’s.

In another the RSAI message can be broadcast to all neighboring UEs.

Another aspect to consider is the timing of the transmission of RSAI.

In one example, the RSAI message is sent aperiodically (once or a few times and then stops)

In another example, the RSAI message is sent periodically (e.g., based on (pre-) configuration.

In one example, a UE transmitting RSAI (IUC) message can broadcast non-preferred resources to surrounding UEs. A surrounding UE can exclude these resources from the candidate sets of the UE. There can be several causes of trigger for the condition-based inter-UE co-ordination, for example based on some condition such as CBR or BLER, or triggered periodically. In one example, periodic transmission is used for at least non-preferred resources, where the period is (pre-) configured. Example of period values can include: {100, 500, 1000, 2000} ms. The period of the condition-based RSAI information is (pre-)configured to one of [{100, 500, 1000, 2000}], if not (pre-)configured a period of 1000 ms is used. A groupcast set for the transmission of condition-based RSAI information can be (pre-) configured, if not (pre-)configured, the condition-based RSAI (IUC) information is broadcast to surrounding UEs.

In one example, a first UE can transmit RSAI (IUC) message to a second UE, when the following conditions are met: (1) the first UE has data to transmit to the second UE; (2) the second UE indicates to the first UE one of the following: (i) the second UE can accept IUC information, (ii) the second UE has data to transmit to the first UE, (iii) the second UE has data to transmit to any (or another) UE, (iv) the second UE can accept IUC information and the second UE has data to transmit to the first UE, or (v) the second UE can accept IUC information and the second UE has data to transmit to any (or another) UE.

The following fields are related to HARQ operation and are used in SCI format 2-A and SCI format 2-B, with the bit width of each field in SCI format 2-A and SCI format 2-B: (1) HARQ process number: 4 bits; (2) new data indicator: 1 bit; (3) redundancy version: 2 bits; and (4) HARQ feedback enabled/disabled indicator: 1 bit.

These fields in total take 8-bits. The size of SCI format 2-C before adding the CRC bits is limited to 140 bits. Therefore, it is desirable to reduce the number of bits in SCI format 2-C that are used for purposes other than the indication of preferred or non-preferred resource sets. Therefore, the necessity of keeping these fields some of them or none of the in the IUC (RSAI) message and IUC (RSAI) request is provided.

In one example, the RSAI (IUC) message (e.g., the inter-UE co-ordination message) is transmitted in both the second stage SCI and MAC CE. The second stage SCI is an SCI format on PSSCH that is dedicated for conveying the RSAI (IUC) message and/or the RSAI (IUC) request (e.g., the second stage SCI is SCI format 2C).

In one example, a SL transmission only includes RSAI (IUC) message (e.g., the inter-UE co-ordination message) transmitted in second stage SCI and in corresponding MAC CE.

In one example, a UE receiving the RSAI (IUC) message successful receives second stage SCI and corresponding SL transmission on PSSCH containing the MAC CE with the RSAI (IUC) message. The UE receiving the RSAI (IUC) message transmits a positive HARQ-ACK (e.g., on PSFCH) to the UE transmitting RSAI (IUC) message. The UE transmitting the RSAI (IUC) message receives the positive HARQ-ACK and does not retransmit the RSAI (IUC) message.

In another example, a UE receiving the RSAI message (IUC) successful receives second stage SCI but fails to decode the corresponding SL transmission on PSSCH containing the MAC CE with the RSAI (IUC) message. The UE receiving the RSAI (IUC) message transmits a negative HARQ-ACK (e.g., on PSFCH) to the UE transmitting RSAI (IUC) message. The UE transmitting the RSAI (IUC) message receives the negative HARQ-ACK and does not retransmit the RSAI (IUC) message. In this example, as the UE receiving the RSAI (IUC) message successfully decoded the second stage SCI, there is no need to retransmit the RSAI (IUC) message even though the MAC CE didn't decode successfully.

In a variant of this example, when the SL data transmission only includes a MAC CE with RSAI (IUC) message, and when the second stage SCI is successfully decoded and the MAC CE is not successfully decoded, the UE receiving the RSAI (IUC) message transmits a positive HARQ-ACK to the UE transmitting the RSAI (IUC) message. The UE transmitting the RSAI (IUC) message receives the positive HARQ-ACK and does not retransmit the RSAI (IUC) message.

In another example, a UE receiving the RSAI (IUC) message fails to successfully decode the second stage SCI and corresponding MAC CE containing the RSAI (IUC) message. The UE receiving the RSAI (IUC) message does not transmit any HARQ-ACK feedback to the UE transmitting the RSAI (IUC) message. The UE transmitting the RSAI (IUC) message does not receive any HARQ-ACK feedback (this could also be the case if the UE transmitting the RSAI (IUC) messages fails to receive the corresponding HARQ-ACK from the UE receiving the RSAI (IUC) message).

For example, this case also includes the scenarios when the UE receiving the RSAI (IUC) message successfully decodes SCI format 2-C, and possibly also successfully decodes the SL transport block, and does not transmit PSFCH due to prioritization, or transmits PSFCH (ACK or NACK) and the PSFCH is missed by the UE transmitting the RSAI (IUC) message. In these scenarios, the UE transmitting the RSAI (IUC) message transmits a SL transmission that can include new RSAI (IUC) message. The UE transmitting the RSAI (IUC) message re-transmits the RSAI (IUC) message using the second stage SCI (e.g., SCI format 2C) and the corresponding MAC CE.

In one example, the UE transmitting the RSAI (IUC) message uses the same redundancy version (RV) for the retransmission as the previous transmission. For example, RV can be 0 (or any other value specified in the system specification) and/or a value pre-configured and/or configured by higher layers. In one example, RV can be omitted from the second stage SCI. In another example, RV is included in the second stage SCI.

In another example, the UE transmitting the RSAI (IUC) message uses a different redundancy version (RV) for the retransmission from that of the previous transmission.

Figure 13:
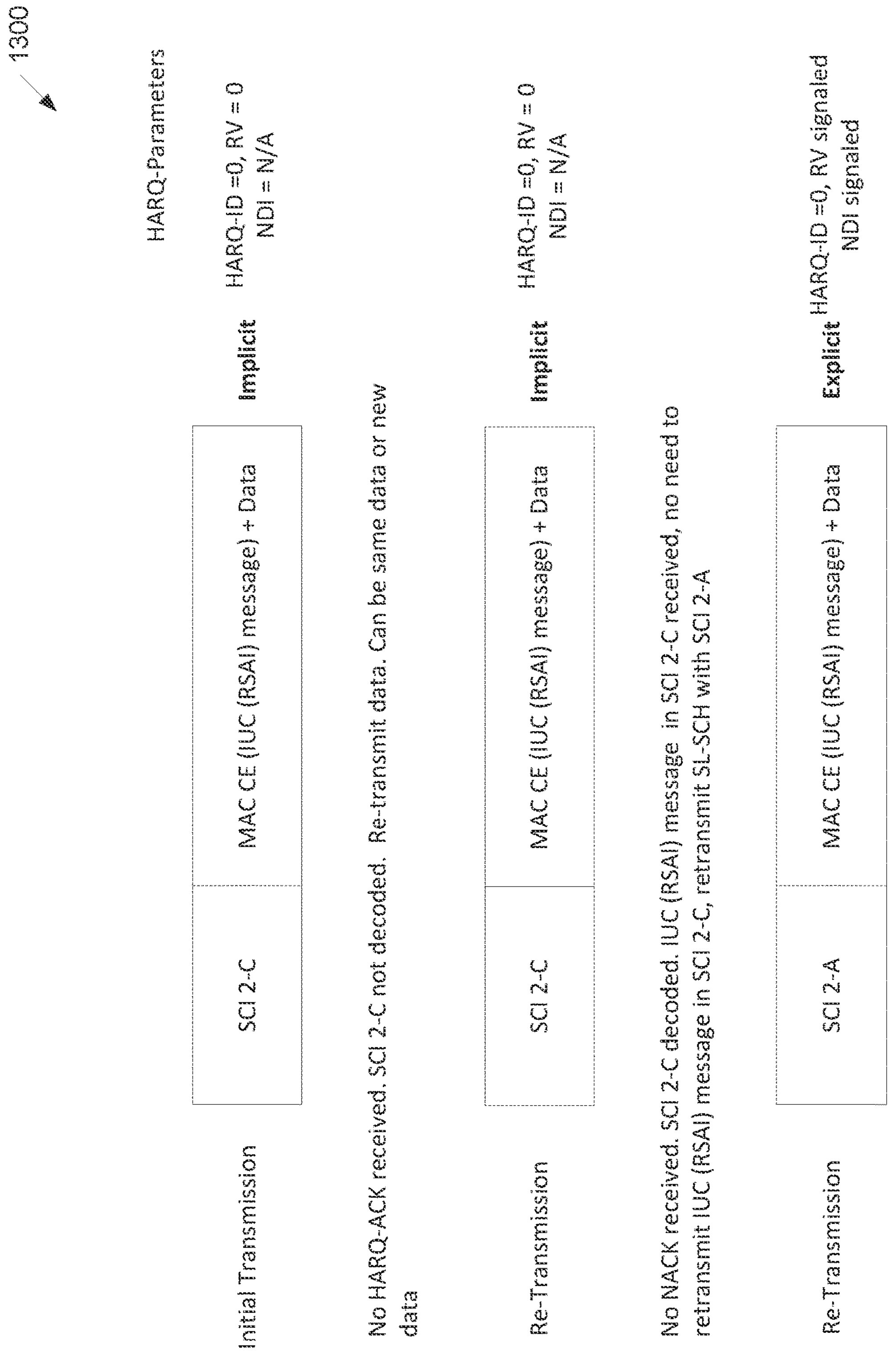
FIG. 13 illustrates an example of a SL transmission includes RSAI (IUC) message transmitted in second stage SCI and in corresponding MAC CE and other SL data according to embodiments of the present disclosure.

FIG. 13 illustrates an example of a SL transmission including RSAI (IUC) message transmitted in second stage SCI and in corresponding MAC CE and other SL data 1300 according to embodiments of the present disclosure. An embodiment of the SL transmission including RSAI (IUC) message transmitted in second stage SCI and in corresponding MAC CE and other SL data 1300 shown in FIG. 13 is for illustration only.

In another example, a SL transmission includes RSAI (IUC) message (e.g., the inter-UE co-ordination message) transmitted in second stage SCI and in corresponding MAC CE and other SL data. FIG. 13 is an illustration of this.

In one example, a UE receiving the RSAI (IUC) message successful receives second stage SCI and corresponding SL transmission on PSSCH containing the MAC CE with the RSAI message (IUC) and other SL data. The UE receiving the RSAI (IUC) message transmits a positive HARQ-ACK (e.g., on PSFCH) to the UE transmitting RSAI message (IUC). The UE transmitting the RSAI message (IUC) receives the positive HARQ-ACK and does not retransmit the RSAI (IUC) message or the other SL data.

In another example, a UE receiving the RSAI message (IUC) successful receives second stage SCI but fails to decode the corresponding SL transmission on PSSCH containing the MAC CE with the RSAI (IUC) message and other SL data. The UE receiving the RSAI (IUC) message transmits a negative HARQ-ACK (e.g., on PSFCH) to the UE transmitting RSAI (IUC) message. The UE transmitting the RSAI message receives the negative HARQ-ACK. In this case, as SCI format 2-C has been successfully decoded, the RSAI (IUC) message has been received by the UE receiving the RSAI (IUC) message. The UE transmitting the RSAI (IUC) message does not need to re-transmit the RSAI (IUC) message in SCI format 2-C as this has already been received.

In one example, the UE does not need to repeat the retransmission of RSAI message on the second stage SCI. The UE can re-transmit the MAC CE and the other SL data using a second stage SCI of format 2-A or format 2-B. While the re-transmission of the MAC CE of the RSAI (IUC) message is not needed, it may be beneficial if the UE receiving the RSAI (IUC) message wants to do HARQ combining. In this case, the UE transmitting the RSAI (IUC) message can use SCI format 2-A or SCI format 2-B for the re-transmission to indicate the HARQ related parameters. There is no need to use SCI format 2-C for the re-transmission.

In another example, the UE transmits a new SL transmission for the SL data only. In this case, the MAC CE RSAI (IUC) message is not included as the information the UE has already been received using the pervious transmission in the corresponding SCI format 2-C. In this case, the UE receiving the RSAI (IUC) message does not perform HARQ combining. In this case, the UE transmitting the RSAI (IUC) message can use SCI format 2-A or SCI format 2-B for the transmission of the SL data.

In another example, the UE repeats the retransmission of RSAI (IUC) message on the second stage SCI. The UE can re-transmit the MAC CE and the other SL data using a second stage SCI of format 2-C.

In another example, a UE receiving the RSAI (IUC) message fails to successfully decode the second stage SCI and corresponding MAC CE containing the RSAI message and other SL data. The UE receiving the RSAI message does not transmit any HARQ-ACK feedback to the UE transmitting the RSAI (IUC) message. The UE transmitting the RSAI (IUC) message does not receive any HARQ-ACK feedback (this could also be the case if the UE transmitting the RSAI message fails to receive the corresponding HARQ-ACK from the UE receiving the RSAI (IUC) message). For example, this case also includes the scenarios when the UE receiving the RSAI (IUC) message successfully decodes SCI format 2-C, and possibly also successfully decodes the SL transport block, and does not transmit PSFCH due to prioritization, or transmits PSFCH (ACK or NACK) and the PSFCH is missed by the UE transmitting the RSAI (IUC) message. In these scenarios, the UE transmitting the RSAI (IUC) message transmits a SL transmission that can include new RSAI (IUC) message. The UE transmitting the RSAI (IUC) message re-transmits the RSAI (IUC) message using the second stage SCI (e.g., SCI format 2C) and the corresponding MAC CE and other SL data.

In one example, the UE transmitting the RSAI (IUC) message uses the same redundancy version (RV) for the retransmission as the previous transmission. For example, RV can be 0 (or any other value specified in the system specification) and/or a value pre-configured and/or configured by higher layers. In one example, RV can be omitted from the second stage SCI. In another example, RV is included in the second stage SCI.

In another example, the UE transmitting the RSAI (IUC) message uses a different redundancy version (RV) for the retransmission from that of the previous transmission.

According to TS 38.214, for the PSSCH assigned by SCI, if table 5.1.3.1-2 of TS 38.214 is used and $0 \le I_{MCS} \le 27$, or a table other than Table 5.1.3.1-2 of TS 38.214 is used and $0 \le I_{MCS} \le 28$, the UE may determine the transport block size (TBS) as described below.

In one example, the UE may first determine the number of REs ($N_{RE}$) within the slot as follows: a UE first determines the number of REs allocated for PSSCH within a $$PRB\ (N'_{RE})\ \text{by}\ N'_{RE} = N_{sc}^{RB}(N_{symb}^{sh} - N_{symb}^{PSFCH}) - N_{oh}^{PRB} - N_{RE}^{DMRS},$$

where: (1)

$$N_{sc}^{RB} = 12$$

is the number of subcarriers in a physical resource block; (2)

$$N_{symb}^{sh} = sl\text{-}LengthSymbols - 2,$$

where sl-LengthSymbols is the number of sidelink symbols within the slot provided by higher layers; (3)

$$N_{symb}^{PSFCH} = 3$$

if 'PSFCH overhead indication' field of SCI format 1-A indicates "1," and $$N_{symb}^{PSFCH} = 0$$

otherwise, if higher layer parameter sl-PSFCH-Period is 2 or 4. If higher layer parameter sl-PSFCH-Period is 0, $$N_{symb}^{PSFCH} = 0.$$

If higher layer parameter sl-PSFCH-Period is 1, $$N_{symb}^{PSFCH} = 3;$$

(4)

$$N_{oh}^{PRB}$$

is the overhead given by higher layer parameter sl-X-Overhead; and (5)

$$N_{RE}^{DMRS}$$

is given by Table 8.1.3.2-1 of TS 38.214 according to higher layer parameter sl-PSSCH-DMRS-TimePattern.

In one example, second the UE then determines the total number of REs allocated for $$PSSCH\ (N_{RE})\ \text{by}\ N_{RE} = N'_{RE} \cdot n_{PRB} - N_{RE}^{SCI,1} - N_{RE}^{SCI,2},$$

where: (1) $n_{PRB}$ is the total number of allocated PRBs for the PSSCH; (2)

$$N_{RE}^{SCI,1}$$

is the total number of REs occupied by the PSCCH and PSCCH DM-RS; and (3)

$$N_{RE}^{SCI,2}$$

is the number of coded modulation symbols generated for $2^{nd}$-stage SCI transmission (prior to duplication for the $2^{nd}$ layer, if present) according to 38.212, with the assumption of $\gamma=0$, as described below.

According to TS 38.212, for $2^{nd}$-stage SCI transmission on PSSCH with SL-SCH, the number of coded modulation symbols generated for $2^{nd}$-stage SCI transmission prior to duplication for the 2nd layer if present, denoted as $Q'_{SCI2}$, is determined as follows:

$$Q'_{SCI2} = \min\left\{\left\lceil \frac{(O_{SCI2} + L_{SCI2}) \cdot \beta_{offset}^{SCI2}}{Q_m^{SCI2} \cdot R} \right\rceil, \left\lceil \alpha \sum_{l=0}^{N_{symbol}^{PSSCH}-1} M_{sc}^{SCI2}(l) \right\rceil\right\} + \gamma$$

where: (1) $O_{SCI2}$ is the number of the $2^{nd}$-stage SCI bits; (2) $L_{SCI2}$ is the number of CRC bits for the $2^{nd}$-stage SCI, which is 24 bits; (3)

$$\beta_{offset}^{SCI2}$$

is indicated in the corresponding $1^{st}$-stage SCI; (4)

$$M_{sc}^{PSSCH}(l)$$

is the scheduled bandwidth of PSSCH transmission, expressed as a number of subcarriers; (5)

$$M_{sc}^{PSSCH}(l)$$

is the number of subcarriers in OFDM symbol l that carry PSCCH and PSCCH DMRS associated with the PSSCH transmission; (6)

$$M_{sc}^{SCI2}(l)$$

is the number of resource elements that can be used for transmission of the $2^{nd}$-stage SCI in OFDM symbol l, for $$l = 0, 1, 2 \ldots , N_{symbol}^{PSSCH} - 1 \text{ and for } N_{symbol}^{PSSCH} = N_{symb}^{sh} - N_{symb}^{PSFCH},$$

in PSSCH transmission, where $$N_{symb}^{sh} = sl\text{-}LengthSymbols - 2,$$

where sl-lengthSymbols is the number of sidelink symbols within the slot provided by higher layers as defined. If higher layer parameter sl-PSFCH-Period=2 or 4, $$N_{symb}^{PSFCH} = 3$$

if "PSFCH overhead indication" field of SCI format 1-A indicates "1," and $$N_{symb}^{PSFCH} = 0$$

otherwise. If higher layer parameter sl-PSFCH-Period=0, $$N_{symb}^{PSFCH} = 0.$$

If higher layer parameter sl-PSFCH-Period is 1, $$N_{symb}^{PSFCH} = 3;$$

(7)

$$M_{sc}^{SCI2}(l) = M_{sc}^{PSSCH}(l) - M_{sc}^{PSCCH}(l);$$

(8) $\gamma$ is the number of vacant resource elements in the resource block to which the last coded symbol of the $2^{nd}$-stage SCI belongs; (9) R is the coding rate as indicated by "Modulation and coding scheme" field in SCI format 1-A; and (10) $\alpha$ is configured by higher layer parameter sl-Scaling.

After the UE has determined the number of REs ($N_{RE}$) as described above, the UE determines TBS according to Steps 2), 3), and 4) as described in TS 38.214.

Based on the previously described procedure, the TBS size depends on the number of REs allocated to the second stage SCI. If SCI format 2-C is used for the transmission of RSAI (IUC) message from a first UE (e.g., UE-A) to a second UE (e.g., UE-B) and the second UE receives the second SCI format 2-C, but not the associated SL data. The second UE transmits a NACK. The first UE re-transmits the second data after receiving the NACK. In one example, the SL data is re-transmitted using SCI format 2-A (or SCI format 2-B), as the number of REs allocated to SCI format 2-A (or SCI format 2-B) is different from the number of REs allocated to SCI format 2-C, according to the procedure described above (TS 38.214 and TS 38.4.4), the TBS size calculated for the re-transmission with SCI format 2-A (or SCI format 2-B), can be different from the TBS size calculated for the previous transmission with SCI format 2-C. To address this issue, and to ensure the same TBS size across all transmissions associated with the same transport, the following can be considered.

In one example, the resource pool is configured such that the number of reserved bits in the first stage SCI (in SL-PSCCH-Config) is greater than 0, e.g., sl-NumReservedBits can be set to 2 or 3 or 4. A release 16 SL UE sets the reserved bits to 0. One of the "reserved" bits in a PSCCH (e.g., the first bit or the last bit or the least significant bit or the most significant bit or the second bit or the second from last bit or the second least significant bit or the second most significant bit) is used to indicate whether the transport block size (TBS) of the accompanying SL data in PSSCH may be calculated, following the procedure described above (TS 38.214 and TS 38.4.4), assuming that the SCI payload size is that of SCI format 2-C or SCI payload size of the SCI format that is actually transmitted in the PSSCH.

For example, this bit can be set as following example.

In one example, when the PSSCH includes a second stage SCI format 2-A (or SCI format 2-B), for a re-transmission, of a SL transmission that included a second stage SCI format 2-C, the bit is set "1." In this case, the TBS size for the re-transmission with a second stage SCI format 2-A (or SCI format 2-B) is calculated using the procedure described above (TS 38.214 and TS 38.4.4), assuming that $$N_{RE}^{SCI,2}$$

is calculated using the SCI format 2-C payload size. In one example, encoding and/or rate matching for the second stage SCI can be performed using the actual payload size of the second stage SCI. In another example, encoding and/or rate matching for the second stage SCI can be performed using the payload size of the second stage SCI used to calculate $$N_{RE}^{SCI,2}$$

(e.g., with extra padding).

In one example, otherwise, the bit is set to zero and the TBS size for the (re-) transmission with a second stage SCI format 2-A (or SCI format 2-B) is calculated using the procedure described above (TS 38.214 and TS 38.4.4), assuming that $$N_{RE}^{SCI,2}$$

is calculated using the payload size of the actual second stage SCI format used for the (re-)transmission (e.g., SCI format 2-A (or SCI format 2-B)).

In one example, a Rel-16 UE sets the bit to zero and there is no change in how the TBS size is calculated, i.e., the TBS size for the (re-)transmission with a second stage SCI format 2-A (or SCI format 2-B) is calculated using the procedure described above (TS 38.214 and TS 38.4.4), assuming that $$N_{RE}^{SCI,2}$$

is calculated using the payload size of the actual second stage SCI format used for the (re-)transmission (e.g., SCI format 2-A (or SCI format 2-B)).

In one example, if the initial transmission of RSIA (IUC) message from a first UE (e.g., UE-A) uses SCI format 2-C to a second UE (e.g., UE-B). The first UE receives a NACK from the second UE. The first UE can re-transmit the SL data using SCI format 2-A. In the corresponding first stage SCI (e.g., SCI format 1-A), the corresponding used reserved bit is set to “1” to indicate that the TBS is calculated assuming SCI format 2-C using the procedure previously described (TS 38.214 and TS 38.4.4).

In one example, the “HARQ process number” is not included in SCI format 2-C when transmitting the RSAI message. The “HARQ process number” can be specified in the system specification (e.g., value 0) and/or pre-configured and/or configured by higher layers. In variant example, the “HARQ process number” is included in SCI format 2-C.

In one example, the “new data indicator” is not included in SCI format 2-C when transmitting the RSAI message. Each transmission of SCI format 2-C can be assumed a new transmission of a RSAI (IUC) message. In variant example, the “new data indicator” is included in SCI format 2-C.

In one example, the “redundancy version” is not included in SCI format 2-C when transmitting the RSAI message. The “redundancy version” can be specified in the system specification (e.g., value 0) and/or pre-configured and/or configured by higher layers. In variant example, the “redundancy version” is included in SCI format 2-C.

In one example, the “HARQ feedback enable/disable indicator” is not included in SCI format 2-C when transmitting the RSAI (IUC) message. The “HARQ feedback enable/disable indicator” can be specified in the system specification (e.g., disable or enable) and/or pre-configured and/or configured by higher layers. In variant example, the “HARQ feedback enable/disable indicator” is included in SCI format 2-C.

In one example, the “cast indicator type” is not included in SCI format 2-C when transmitting the RSAI message. The “cast indicator type” can be specified in the system specification (e.g., value unicast) and/or pre-configured and/or configured by higher layers. In variant example, the “cast indicator type” is included in SCI format 2-C.

In one example, the “CSI request” is not included in SCI format 2-C when transmitting the RSAI message. The “CSI request” can be specified in the system specification (e.g., value disabled or enabled) and/or pre-configured and/or configured by higher layers. In variant example, the “CSI request” is included in SCI format 2-C.

In one example, the second stage SCI for RSAI (IUC) message (e.g., SCI format 2C) does not include Zone ID or Communication range requirement. If a first UE transmitting the RSAI (IUC) message receives a negative HARQ-ACK (NACK) in response to transmitting the RSAI (IUC) message with other SL data to a second UE. The first UE re-transmits the MAC CE with the RSAI (IUC) message and the other SL data using SCI format 2A.

In one example, the second stage SCI for RSAI (IUC) message (e.g., SCI format 2C) includes Zone ID and Communication range requirement. If a first UE transmitting the RSAI (IUC) message receives a negative HARQ-ACK (NACK) in response to transmitting the RSAI (IUC) message with other SL data to a second UE. The first UE re-transmits the MAC CE with the RSAI (IUC) message and the other SL data using SCI format 2B.

In one example, the RSAI (IUC) request (e.g., the inter-UE co-ordination request from a UE-B to a UE-A) is transmitted in both the second stage SCI and MAC CE. The second stage SCI is an SCI format on PSSCH that is dedicated for conveying the RSAI message and/or the RSAI (IUC) request (e.g., the second stage SCI is SCI format 2C).

In one example, an SL transmission only includes RSAI (IUC) request (e.g., the inter-UE co-ordination request from a UE-B to a UE-A) transmitted in second stage SCI and in corresponding MAC CE.

In one example, a UE receiving the RSAI (IUC) request successful receives second stage SCI and corresponding SL transmission on PSSCH containing the MAC CE with the RSAI (IUC) request. The UE receiving the RSAI request transmits a positive HARQ-ACK (e.g., on PSFCH) to the UE transmitting RSAI request. The UE transmitting the RSAI (IUC) request receives the positive HARQ-ACK and does not retransmit the RSAI (IUC) request.

In another example, a UE receiving the RSAI (IUC) request successful receives second stage SCI but fails to decode the corresponding SL transmission on PSSCH containing the MAC CE with the RSAI (IUC) request. The UE receiving the RSAI (IUC) request transmits a negative HARQ-ACK (e.g., on PSFCH) to the UE transmitting RSAI (IUC) request. The UE transmitting the RSAI (IUC) request receives the negative HARQ-ACK and does not retransmit the RSAI (IUC) request. In this example, as the UE receiving the RSAI (IUC) request successfully decoded the second stage SCI, there is no need to retransmit the RSAI (IUC) request even though the MAC CE did not decode successfully.

In a variant of this example, when the SL data transmission only includes a MAC CE with RSAI (IUC) request, and when the second stage SCI is successfully decoded and the MAC CE is not successfully decoded, the UE receiving the RSAI (IUC) request transmits a positive HARQ-ACK to the UE transmitting the RSAI (IUC) request. The UE transmitting the RSAI (IUC) request receives the positive HARQ-ACK and does not retransmit the RSAI (IUC) request.

In another example, a UE receiving the RSAI (IUC) request fails to successfully decode the second stage SCI and corresponding MAC CE containing the RSAI (IUC) request. The UE receiving the RSAI (IUC) request does not transmit any HARQ-ACK feedback to the UE transmitting the RSAI (IUC) request. The UE transmitting the RSAI (IUC) request does not receive any HARQ-ACK feedback (this could also be the case if the UE transmitting the RSAI (IUC) request fails to receive the corresponding HARQ-ACK from the UE receiving the RSAI (IUC) request).

For example, this case also includes the scenarios when the UE receiving the RSAI (IUC) request successfully decodes SCI format 2-C, and possibly also successfully decodes the SL transport block, and does not transmit PSFCH due to prioritization, or transmits PSFCH (ACK or NACK) and the PSFCH is missed by the UE transmitting the RSAI (IUC) request. In these scenarios, the UE transmitting the RSAI (IUC) request transmits a SL transmission that can include new RSAI (IUC) request. The UE transmitting the RSAI (IUC) request re-transmits the RSAI (IUC) request using the second stage SCI (e.g., SCI format 2C) and the corresponding MAC CE.

In one example, the UE transmitting the RSAI (IUC) request uses the same redundancy version (RV) for the retransmission as the previous transmission. For example, RV can be 0 (or any other value specified in the system specification) and/or a value pre-configured and/or configured by higher layers. In one example, RV can be omitted from the second stage SCI. In another example, RV is included in the second stage SCI.

In another example, the UE transmitting the (IUC) RSAI request uses a different redundancy version (RV) for the retransmission from that of the previous transmission.

Figure 14:
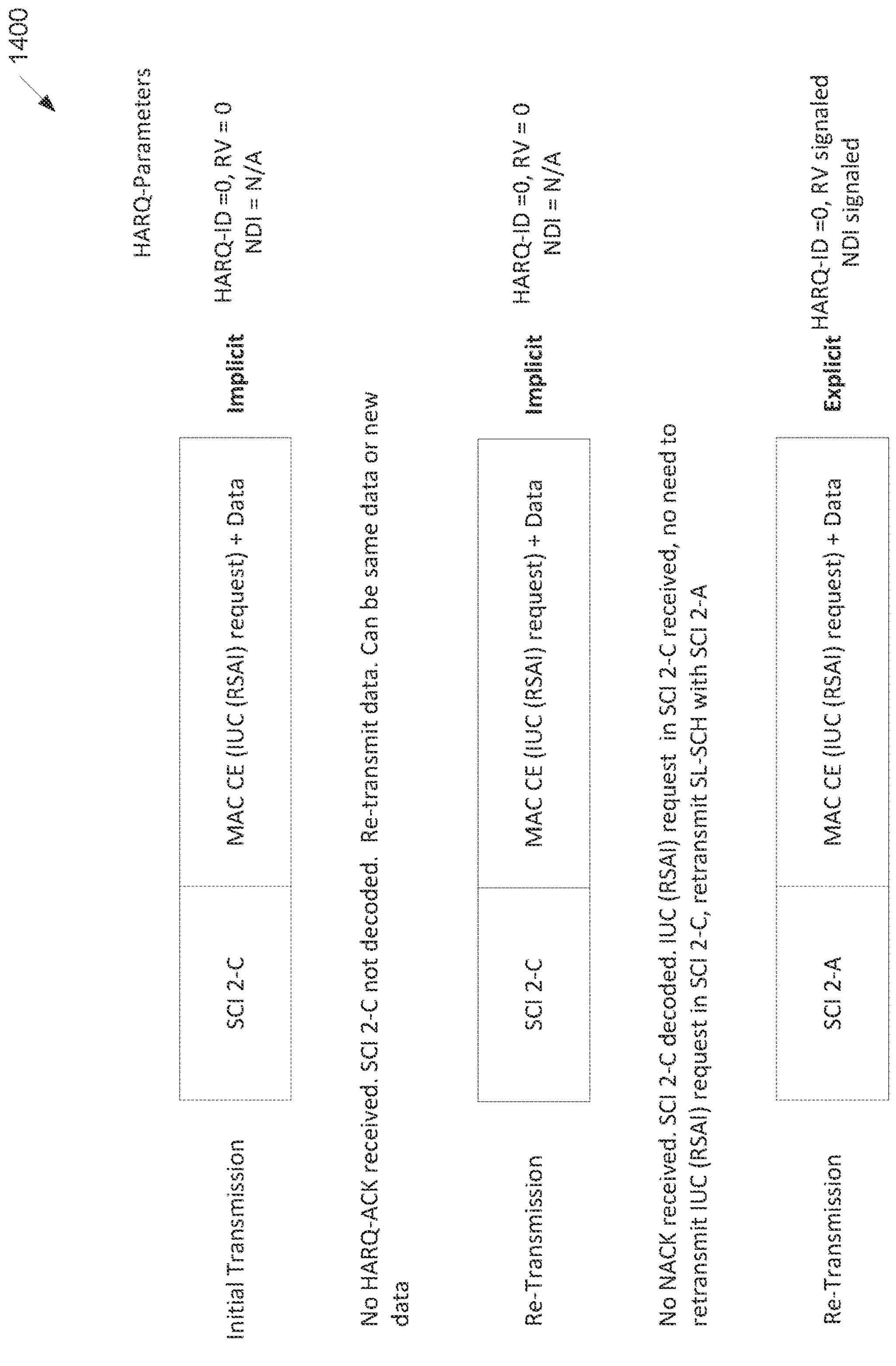
FIG. 14 illustrates another example of a SL transmission includes RSAI (IUC) message transmitted in second stage SCI and in corresponding MAC CE and other SL data according to embodiments of the present disclosure.

In another example, an SL transmission includes RSAI (IUC) request (e.g., the inter-UE co-ordination request from a UE-B to a UE-A) transmitted in second stage SCI and in corresponding MAC CE and other SL data. FIG. 14 is an illustration of this.

FIG. 14 illustrates another example of a SL transmission including RSAI (IUC) message transmitted in second stage SCI and in corresponding MAC CE and other SL data 1400 according to embodiments of the present disclosure. An embodiment of the SL transmission including RSAI (IUC) message transmitted in second stage SCI and in corresponding MAC CE and other SL data 1400 shown in FIG. 14 is for illustration only.

In one example, a UE receiving the RSAI (IUC) request successful receives second stage SCI and corresponding SL transmission on PSSCH containing the MAC CE with the RSAI (IUC) request and other SL data. The UE receiving the RSAI request transmits a positive HARQ-ACK (e.g., on PSFCH) to the UE transmitting RSAI (IUC) request. The UE transmitting the RSAI (IUC) request receives the positive HARQ-ACK and does not retransmit the RSAI (IUC) request or the other SL data.

In another example, a UE receiving the RSAI (IUC) request successful receives second stage SCI but fails to decode the corresponding SL transmission on PSSCH containing the MAC CE with the RSAI (IUC) request and other SL data. The UE receiving the RSAI (IUC) request transmits a negative HARQ-ACK (e.g., on PSFCH) to the UE transmitting RSAI (IUC) request. The UE transmitting the RSAI request receives the negative HARQ-ACK. In this case, as SCI format 2-C has been successfully decoded, the RSAI (IUC) message has been received by the UE receiving the RSAI (IUC) request. The UE transmitting the RSAI (IUC) request does not need to re-transmit the RSAI (IUC) message in SCI format 2-C as this has already been received.

In one example, the UE does not need to repeat the retransmission of RSAI request on the second stage SCI. The UE can re-transmit the MAC CE and the other SL data using a second stage SCI of format 2-A or format 2-B. While the re-transmission of the MAC CE of the RSAI (IUC) request is not needed, it may be beneficial if the UE receiving the RSAI (IUC) request wants to do HARQ combining. In this case, the UE transmitting the RSAI (IUC) request can use SCI format 2-A or SCI format 2-B for the re-transmission to indicate the HARQ related parameters. There is no need to use SCI format 2-C for the re-transmission.

In another example, the UE transmits a new SL transmission for the SL data only. In this case, the MAC CE RSAI (IUC) message is not included as the information the UE has already been received using the pervious transmission in the corresponding SCI format 2-C. In this case, the UE receiving the RSAI (IUC) request does not perform HARQ combining. In this case, the UE transmitting the RSAI (IUC) request can use SCI format 2-A or SCI format 2-B for the transmission of the SL data.

In another example, the UE repeats the retransmission of RSAI (IUC) request on the second stage SCI. The UE can re-transmit the MAC CE and the other SL data using a second stage SCI of format 2-C.

In another example, a UE receiving the RSAI (IUC) request fails to successfully decode the second stage SCI and corresponding MAC CE containing the RSAI (IUC) request and other SL data. The UE receiving the RSAI (IUC) request does not transmit any HARQ-ACK feedback to the UE transmitting the RSAI (IUC) request. The UE transmitting the RSAI (IUC) request does not receive any HARQ-ACK feedback (this could also be the case if the UE transmitting the RSAI (IUC) request fails to receive the corresponding HARQ-ACK from the UE receiving the RSAI (IUC) request). For example, this case also includes the scenarios when the UE receiving the RSAI (IUC) request successfully decodes SCI format 2-C, and possibly also successfully decodes the SL transport block, and does not transmit PSFCH due to prioritization, or transmits PSFCH (ACK or NACK) and the PSFCH is missed by the UE transmitting the RSAI (IUC) request. In these scenarios, the UE transmitting the RSAI (IUC) request transmits a SL transmission that can include new RSAI (IUC) request. The UE transmitting the RSAI (IUC) request re-transmits the RSAI request using the second stage SCI (e.g., SCI format 2C) and the corresponding MAC CE and other SL data.

In one example, the UE transmitting the RSAI (IUC) request uses the same redundancy version (RV) for the retransmission as the previous transmission. For example, RV can be 0 (or any other value specified in the system specification) and/or a value pre-configured and/or configured by higher layers. In one example, RV can be omitted from the second stage SCI. In another example, RV is included in the second stage SCI.

In another example, the UE transmitting the RSAI (IUC) request uses a different redundancy version (RV) for the retransmission from that of the previous transmission.

Based on the previously described procedure for the determination of the TBS size of SL data transmission, the TBS size depends on the number of REs allocated to the second stage SCI. If SCI format 2-C is used for the transmission of RSAI (IUC) request from a first UE (e.g., UE-B) to a second UE (e.g., UE-A) and the second UE receives the second SCI format 2-C, but not the associated SL data. The second UE transmits a NACK. The first UE re-transmits the second data after receiving the NACK. In one example, the SL data is re-transmitted using SCI format 2-A (or SCI format 2-B), as the number of REs allocated to SCI format 2-A (or SCI format 2-B) is different from the number of REs allocated to SCI format 2-C, according to the procedure previously described (TS 38.214 and TS 38.4.4), the TBS size calculated for the re-transmission with SCI format 2-A (or SCI format 2-B), can be different from the TBS size calculated for the previous transmission with SCI format 2-C. To address this issue, and to ensure the same TBS size across all transmissions associated with the same transport, the following can be considered.

In one example, the resource pool is configured such that the number of reserved bits in the first stage SCI (in SL-PSCCH-Config) is greater than 0, e.g., sl-NumReserved-Bits can be set to 2 or 3 or 4. A release 16 SL UE sets the reserved bits to 0. One of the "reserved" bits in a PSCCH (e.g., the first bit or the last bit or the least significant bit or the most significant bit or the second bit or the second from last bit or the second least significant bit or the second most significant bit) is used to indicate whether the transport block size (TBS) of the accompanying SL data in PSSCH may be calculated, following the procedure previously described (TS 38.214 and TS 38.4.4), assuming that the SCI payload size is that of SCI format 2-C or SCI payload size of the SCI format that is actually transmitted in the PSSCH.

For example, this bit can be set as following examples.

In one example, when the PSSCH includes a second stage SCI format 2-A (or SCI format 2-B), for a re-transmission, of a SL transmission that included a second stage SCI format 2-C, the bit is set "1." In this case, the TBS size for the re-transmission with a second stage SCI format 2-A (or SCI format 2-B) is calculated using the procedure previously described (TS 38.214 and TS 38.4.4), assuming that $$N_{RE}^{SCI,2}$$

is calculated using the SCI format 2-C payload size. In one example, encoding and/or rate matching for the second stage SCI can be performed using the actual payload size of the second stage SCI. In another example, encoding and/or rate matching for the second stage SCI can be performed using the payload size of the second stage SCI used to calculate $$N_{RE}^{SCI,2}$$

(e.g., with extra padding).

In one example, otherwise, the bit is set to zero and the TBS size for the (re-) transmission with a second stage SCI format 2-A (or SCI format 2-B) is calculated using the procedure previously described (TS 38.214 and TS 38.4.4), assuming that $$N_{RE}^{SCI,2}$$

is calculated using the payload size of the actual second stage SCI format used for the (re-)transmission (e.g., SCI format 2-A (or SCI format 2-B)).

In one example, a Rel-16 UE sets the bit to zero and there is no change in how the TBS size is calculated, i.e., the TBS size for the (re-)transmission with a second stage SCI format 2-A (or SCI format 2-B) is calculated using the procedure previously described (TS 38.214 and TS 38.4.4), assuming that $$N_{RE}^{SCI,2}$$

is calculated using the payload size of the actual second stage SCI format used for the (re-)transmission (e.g., SCI format 2-A (or SCI format 2-B)).

In one example, if the initial transmission of RSIA (IUC) request from a first UE (e.g., UE-B) uses SCI format 2-C to a second UE (e.g., UE-A). The first UE receives a NACK from the second UE. The first UE can re-transmit the SL data using SCI format 2-A. In the corresponding first stage SCI (e.g., SCI format 1-A), the corresponding reserved bit is set to "1" to indicate that the TBS is calculated assuming SCI format 2-C using the procedure previously described (TS 38.214 and TS 38.4.4).

In one example, the "HARQ process number" is not included in SCI format 2-C when transmitting the RSAI request. The "HARQ process number" can be specified in the system specification (e.g., value 0) and/or pre-configured and/or configured by higher layers. In variant example, the "HARQ process number" is included in SCI format 2-C.

In one example, the "new data indicator" is not included in SCI format 2-C when transmitting the RSAI request. Each transmission of SCI format 2-C can be assumed a new transmission of a RSAI (IUC) request. In variant example, the "new data indicator" is included in SCI format 2-C.

In one example, the "redundancy version" is not included in SCI format 2-C when transmitting the RSAI request. The "redundancy version" can be specified in the system specification (e.g., value 0) and/or pre-configured and/or configured by higher layers. In variant example, the "redundancy version" is included in SCI format 2-C.

In one example, the "HARQ feedback enable/disable indicator" is not included in SCI format 2-C when transmitting the RSAI (IUC) request. The "HARQ feedback enable/disable indicator" can be specified in the system specification (e.g., disable or enable) and/or pre-configured and/or configured by higher layers. In variant example, the "HARQ feedback enable/disable indicator" is included in SCI format 2-C.

In one example, the "cast indicator type" is not included in SCI format 2-C when transmitting the RSAI request. The "cast indicator type" can be specified in the system specification (e.g., value unicast) and/or pre-configured and/or configured by higher layers. In variant example, the "cast indicator type" is included in SCI format 2-C.

In one example, the "CSI request" is not included in SCI format 2-C when transmitting the RSAI request. The "CSI request" can be specified in the system specification (e.g., value disabled or enabled) and/or pre-configured and/or configured by higher layers. In variant example, the "CSI request" is included in SCI format 2-C.

In one example, the second stage SCI for RSAI (IUC) request (e.g., SCI format 2C) does not include Zone ID or Communication range requirement. If a first UE transmitting the RSAI (IUC) request receives a negative HARQ-ACK (NACK) in response to transmitting the RSAI (IUC) request with other SL data to a second UE. The first UE re-transmits the MAC CE with the RSAI (IUC) request and the other SL data using SCI format 2A.

In one example, the second stage SCI for RSAI (IUC) request (e.g., SCI format 2C) includes Zone ID and Communication range requirement. If a first UE transmitting the RSAI (IUC) request receives a negative HARQ-ACK (NACK) in response to transmitting the RSAI (IUC) request with other SL data to a second UE. The first UE re-transmits the MAC CE with the RSAI (IUC) request and the other SL data using SCI format 2B.

Based on the examples discussed herein, SCI format 2-C can be used for an initial SL transmission. The HARQ process used for a SL transmission with RSAI (IUC) message or RSAI (IUC) request can be fixed to 0 (for example) or to a (pre-)configured value and does not need to be signaled in SCI format 2-C. The UE transmitting the RSAI (IUC) message or RSAI (IUC) request, for example, can reserve this HARQ process to use when the UE has RSAI (IUC) message or RSAI (IUC) request to transmit using SCI format 2-C. The RV field can be fixed to 0 or to a pre-configured value and does not need to be signaled in SCI format 2-C. As SCI format 2-C is used with an initial transmission, the NDI field is not applicable.

Similarly, the HARQ feedback enabled/disabled indicator is not needed as the SL transmission with SCI format 2-C can be considered as an initial transmission. In one example, it is also possible to combine a SL transmission with SCI format 2-C with a previous SL transmission with SCI format 2-C (e.g., the SL transmission with SIC format 2-C is not considered an initial transmission in this case).

The UE-B procedure to determine whether or not to do HARQ combining can be follow this simple procedure: (1) if a UE-B receives a SCI format 2-C with the same data (e.g., same values in all fields of SCI format 2-C) as the previous SCI format 2-C, the UE-B can perform HARQ combining; and (2) if a UE-B receives a SCI format 2-C with different data (e.g., different values in at least some of the fields of SCI format 2-C) than the previous SCI format 2-C, the UE-B may not do HARQ combining.

In one example, HARQ re-transmissions (e.g., HARQ combining) are disabled for a transmission containing RSAI (IUC) message.

In one example, through (pre)-configuration HARQ re-transmissions (e.g., HARQ combining) can be disabled for a transmission containing RSAI (IUC) message. If not (pre-) configured HARQ re-transmissions (e.g., HARQ combining) are enabled for a transmission containing RSAI (IUC) message.

In one example, through (pre)-configuration HARQ re-transmissions (e.g., HARQ combining) can be enabled for a transmission containing RSAI (IUC) message. If not (pre-) configured HARQ re-transmissions (e.g., HARQ combining) are disabled for a transmission containing RSAI (IUC) message.

In one example, HARQ re-transmissions (e.g., HARQ combining) are disabled for a transmission containing RSAI (IUC) request.

In one example, through (pre)-configuration HARQ re-transmissions (e.g., HARQ combining) can be disabled for a transmission containing RSAI (IUC) request. If not (pre-) configured HARQ re-transmissions (e.g., HARQ combining) are enabled for a transmission containing RSAI (IUC) request.

In one example, through (pre)-configuration HARQ re-transmissions (e.g., HARQ combining) can be enabled for a transmission containing RSAI (IUC) request. If not (pre-) configured HARQ re-transmissions (e.g., HARQ combining) are disabled for a transmission containing RSAI (IUC) request.

In the present disclosure: (1) the content and structure of signaling messages for RSAI (IUC) request are provide; (2) the content and structure of signaling messages for RSAI (IUC) message; and (3) the disclosure can be applicable to Rel-17 NR specifications for sidelink enhancements.

A sidelink is one of the promising features of NR, targeting verticals such the automotive industry, public safety and other commercial application. Sidelink has been first introduced to NR in release 16, with emphasis on V2X and public safety when the requirements are met. To expand sidelink support to other types of UEs such a vulnerable road users (VRUs), pedestrian UEs (PUEs) and other types of hand-held devices, enhancing reliability and latency of SL transmissions is of paramount importance. One of the main motivation of the release 17 work item on enhanced sidelink is to reduce latency and enhance reliability through inter-UE co-ordination.

The present disclosure provides signaling structure and content for RSAI (IUC) request and RSAI (IUC) message for inter-UE coordination.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A second user equipment (UE) in a wireless communication system, the second UE comprising:

a transceiver; and at least one processor coupled with the transceiver and configured to:

receive, from a first UE on a physical sidelink control channel (PSCCH), a first stage sidelink control information (SCI) format including a field with 2 bits indicating a second stage SCI format for inter-UE coordination information, wherein, in case that a value of the field is 10, the field indicates a SCI format 2-C, and receive, from the first UE on a physical sidelink shared channel (PSSCH), the SCI format 2-C including a one bit indicator, wherein, in case that a value of the one bit indicator is 0, the SCI format 2-C is used for providing the inter-UE coordination information, wherein, in case that the value of the one bit indicator is 1, the SCI format 2-C is used for requesting the inter-UE coordination information, wherein, in case that the SCI format 2-C is for providing the inter-UE coordination information, the SCI format 2-C includes information on a first resource location and information on a resource type, and wherein the information on the resource type indicates preferred resources or non-preferred resources.

2. The second UE of claim 1, wherein in case that the SCI format 2-C is for requesting the inter-UE coordination information, the SCI format 2-C includes information on a resource selection window, information on a resource type, and padding bits, wherein the information on the resource selection window indicates start time and end time of the resource selection window, and wherein the information on the resource type indicates preferred resources or non-preferred resources.

3. The second UE of claim 1, wherein the SCI format 2-C further includes information on a reference slot location, wherein the reference slot location is based on a device-to-device, D2D, frame number, DFN, index and a slot index, and wherein, in case that a first resource location of a first time resource indicator value, TRIV, is a slot offset 0 based on the reference slot location, a first resource location of m-th TRIV is indicated by m-th slot offset and the m is larger than 1.

4. A first user equipment (UE) in a wireless communication system, the first UE comprising:

a transceiver; and at least one processor coupled with the transceiver and configured to:

transmit, to a second UE on a physical sidelink control channel (PSCCH), a first stage sidelink control information (SCI) format including a field with 2 bits indicating a second stage SCI format for inter-UE coordination information, wherein, in case that a value of the field is 10, the field indicates a SCI format 2-C, and transmit, to the second UE on a physical sidelink shared channel (PSSCH), the SCI format 2-C including a one bit indicator, wherein, in case that a value of the one bit indicator is 0, the SCI format 2-C is used for providing the inter-UE coordination information, wherein, in case that the value of the one bit indicator is 1, the SCI format 2-C is used for requesting the inter-UE coordination information, wherein in case that the SCI format 2-C is for providing the inter-UE coordination information, the SCI format 2-C includes information on a first resource location and information on a resource type, and wherein the information on the resource type indicates preferred resources or non-preferred resources.

5. The first UE of claim 4, wherein, in case that the SCI format 2-C is for requesting the inter-UE coordination information, the SCI format 2-C includes information on a resource selection window, information on a resource type, and padding bits, wherein the information on the resource selection window indicates start time and end time of the resource selection window, and wherein the information on the resource type indicates preferred resources or non-preferred resources.

6. The first UE of claim 4, wherein the SCI format 2-C further includes information on a reference slot location, wherein the reference slot location is based on a device-to-device, D2D, frame number, DFN, index and a slot index, and wherein, in case that a first resource location of a first time resource indicator value, TRIV, is a slot offset 0 based on the reference slot location, a first resource location of m-th TRIV is indicated by m-th slot offset and the m is larger than 1.

7. A method performed by a second user equipment (UE) in a wireless communication system, the method comprising:

receiving, from a first UE on a physical sidelink control channel (PSCCH), a first stage sidelink control information (SCI) format including a field with 2 bits indicating a second stage SCI format for inter-UE coordination information, wherein, in case that a value of the field is 10, the field indicates a SCI format 2-C; and receiving, from the first UE on a physical sidelink shared channel (PSSCH), the SCI format 2-C including a one bit indicator, wherein, in case that a value of the one bit indicator is 0, the SCI format 2-C is used for providing the inter-UE coordination information, wherein, in case that the value of the one bit indicator is 1, the SCI format 2-C is used for requesting the inter-UE coordination information, wherein, in case that the SCI format 2-C is for providing the inter-UE coordination information, the SCI format 2-C includes information on a first resource location and information on a resource type, and wherein the information on the resource type indicates preferred resources or non-preferred resources.

8. The method of claim 7, wherein, in case that the SCI format 2-C is for requesting the inter-UE coordination information, the SCI format 2-C includes information on a resource selection window, information on a resource type, and padding bits, wherein the information on the resource selection window indicates start time and end time of the resource selection window, and wherein the information on the resource type indicates preferred resources or non-preferred resources.

9. The method of claim 7, wherein the SCI format 2-C further includes information on a reference slot location, wherein the reference slot location is based on a device-to-device, D2D, frame number, DFN, index and a slot index, and wherein, in case that a first resource location of a first time resource indicator value, TRIV, is a slot offset 0 based on the reference slot location, a first resource location of m-th TRIV is indicated by m-th slot offset and the m is larger than 1.

10. A method performed by a first user equipment (UE) in a wireless communication system, the method comprising:

transmitting, to a second UE on a physical sidelink control channel (PSCCH), a first stage sidelink control information (SCI) format including a field with 2 bits indicating a second stage SCI format for inter-UE coordination information, wherein, in case that a value of the field is 10, the field indicates a SCI format 2-C; and transmitting, to the second UE on a physical sidelink shared channel (PSSCH), the SCI format 2-C including a one bit indicator, wherein, in case that a value of the one bit indicator is 0, the SCI format 2-C is used for providing the inter-UE coordination information, wherein, in case that the value of the one bit indicator is 1, the SCI format 2-C is used for requesting the inter-UE coordination information, wherein, in case that the SCI format 2-C is for providing the inter-UE coordination information, the SCI format 2-C includes information on a first resource location and information on a resource type, and wherein the information on the resource type indicates preferred resources or non-preferred resources.

11. The method of claim 10, wherein, in case that the SCI format 2-C is for requesting the inter-UE coordination information, the SCI format 2-C includes information on a resource selection window, information on a resource type, and padding bits, wherein the information on the resource selection window indicates start time and end time of the resource selection window, and wherein the information on the resource type indicates preferred resources or non-preferred resources.

12. The method of claim 10, wherein the SCI format 2-C further includes information on a reference slot location, wherein the reference slot location is based on a device-to-device, D2D, frame number, DEN, index and a slot index, and wherein, in case that a first resource location of a first time resource indicator value, TRIV, is a slot offset 0 based on the reference slot location, a first resource location of m-th TRIV is indicated by m-th slot offset and the m is larger than 1.

* * * * *